US011781898B2

(12) United States Patent
Hirani et al.

(10) Patent No.: US 11,781,898 B2
(45) Date of Patent: Oct. 10, 2023

(54) SUPPORT STRUCTURE FOR A CONVEYOR SYSTEM

(71) Applicant: ILLINOIS TOOL WORKS INC., Glenview, IL (US)

(72) Inventors: Hitesh R. Hirani, Hampshire (GB); Andrew T. Alexander, Hampshire (GB)

(73) Assignee: ILLINOIS TOOL WORKS INC., Glenview, IL (US)

( * ) Notice: Subject to any disclaimer, the term of this patent is extended or adjusted under 35 U.S.C. 154(b) by 641 days.

(21) Appl. No.: 16/816,955

(22) Filed: Mar. 12, 2020

(65) Prior Publication Data
US 2020/0300689 A1    Sep. 24, 2020

(30) Foreign Application Priority Data

Mar. 21, 2019    (EP) ..................................... 19164491

(51) Int. Cl.
*B65G 37/00* (2006.01)
*B65G 41/00* (2006.01)
(Continued)

(52) U.S. Cl.
CPC .......... *G01G 11/003* (2013.01); *B65G 37/00* (2013.01); *B65G 41/006* (2013.01); *G01G 17/02* (2013.01); *B65G 2201/0217* (2013.01); *B65G 2203/0258* (2013.01); *B65G 2203/044* (2013.01); *B65G 2207/20* (2013.01)

(58) Field of Classification Search
CPC .... G01G 11/003; G01G 17/02; B65G 41/006; B65G 2201/0217; B65G 2203/0258; B65G 2203/044; B65G 2207/20; B65G 37/00

See application file for complete search history.

(56) References Cited

U.S. PATENT DOCUMENTS 3,463,330 A * 8/1969 Roberts ................. B21D 43/22
271/201
3,494,507 A * 2/1970 Ricciardi ............. G01G 11/003
177/121

(Continued)

FOREIGN PATENT DOCUMENTS

WO    WO 2011/007378    1/2011
WO    WO 2011/056602    5/2011

OTHER PUBLICATIONS

Takahashi, Atsushi, Weight Inspection Method, Weight Inspection Apparatus, and Metric Error Reduction Method, Dec. 24, 2004, JP 2004361156 (Year: 2004).*

(Continued)

*Primary Examiner* — Gene O Crawford
*Assistant Examiner* — Lester Rushin, III
(74) *Attorney, Agent, or Firm* — THOMPSON HINE LLP

(57) ABSTRACT

A product inspection apparatus includes a conveyor system for transporting items. The conveyor system includes a weigh conveyor with a load detector for detecting the weight of items transported on the conveyor system and a transport conveyor adjacent the weigh conveyor. The apparatus also includes a support structure with a support beam. The transport conveyor is mounted to the support beam by at least one support column externally mounted to the support beam such that vibrations are suppressed by the at least one externally mounted support column.

20 Claims, 15 Drawing Sheets

(51) Int. Cl.
G01G 11/00 (2006.01)
G01G 17/02 (2006.01)

(56) References Cited

U.S. PATENT DOCUMENTS

RE29,030 E * 11/1976 Hirahara .................. A23N 7/02
                                                                                            99/626
7,432,455 B2 * 10/2008 Berger .................... G01G 11/00
                                                                                            177/244
10,500,726 B2 * 12/2019 Gildert .................... B25J 9/1664

OTHER PUBLICATIONS

Berger Hermann, Weighing Conveyor, May 26, 2011, DE102009047090 A1 (Year: 2011).*

* cited by examiner

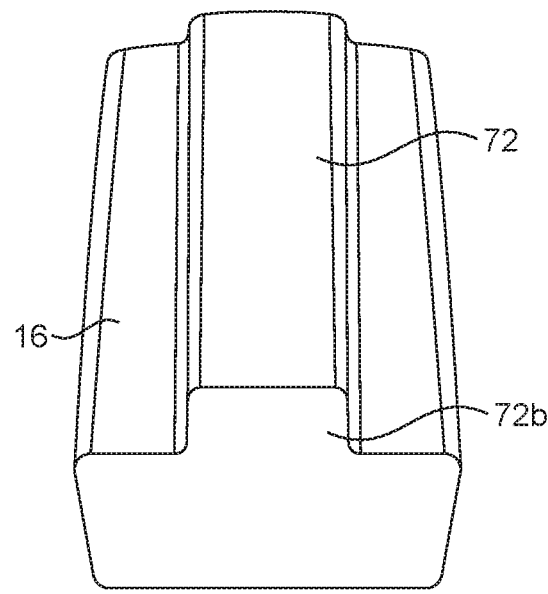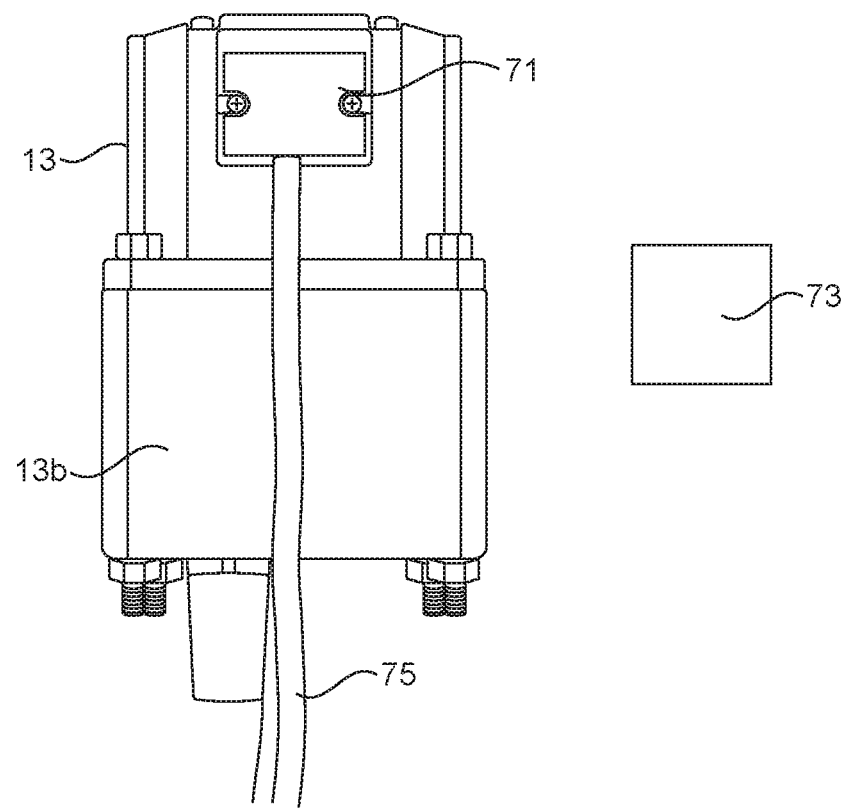
FIG. 12A

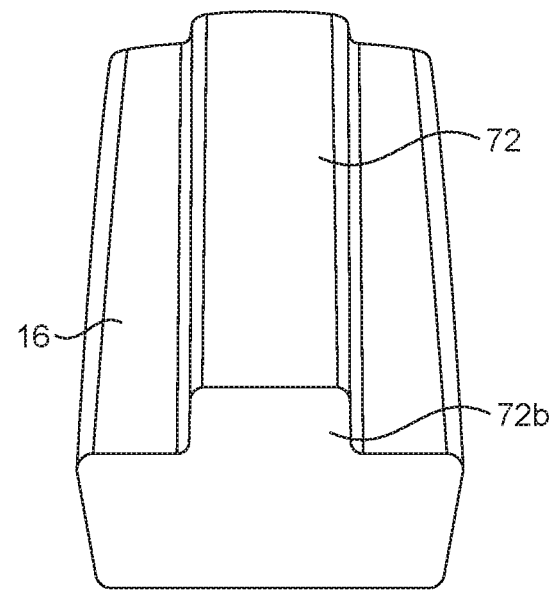
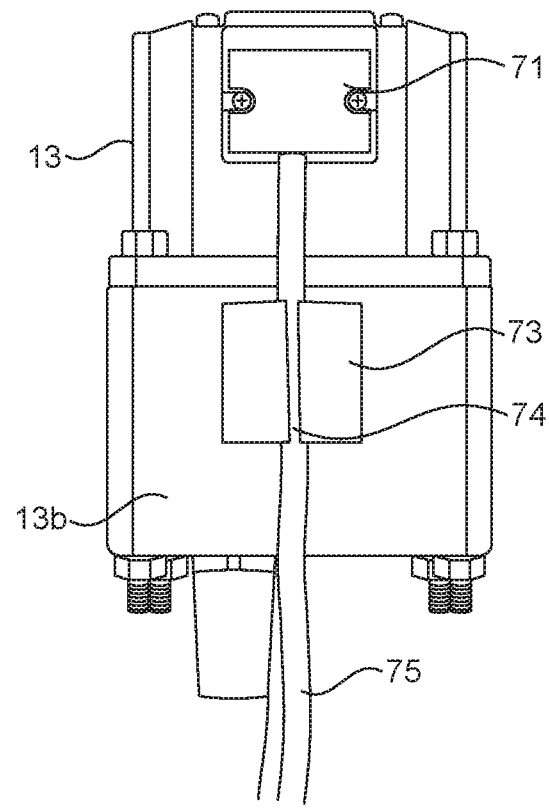
FIG. 12B

SUPPORT STRUCTURE FOR A CONVEYOR SYSTEM

FIELD OF THE INVENTION

The present invention relates to the field of support structures or frames for product inspection apparatus. More particularly, the invention concerns a support structure or frame for supporting a checkweigher, optionally together with other product inspection equipment such as a metal detector and/or X-ray machine, in a conveyor system of a product inspection apparatus.

BACKGROUND

Food products and packaged commodities are rigorously inspected to make sure that they comply with applicable standards with regards to weight, hygiene or presence of contamination etc. For example, in the European Union the accuracy of weight measurements should meet the requirements dictated by the Measuring Instruments Directive (MID). Equivalent legislation concerning accuracy of weight measurements exist in other regions of the world.

To inspect large numbers of products in a production line, they are typically inspected as they are transported by a conveyor apparatus. In the example of weighing packages, the packages to be weighed are delivered to a conveyor system, specifically an automatic checkweigher which comprises a series of conveyor belts. A weight sensor or transducer, e.g. a strain-gauge load cell, is used to dynamically determine the weight of each package as it passes over a weigh belt. If the package weighs within the allowed tolerance, it will continue to be transported on an exit belt. However, if the weight of a package falls outside of the specified limits during the dynamic weighing process, a pushing device, e.g. a linear or radial actuator, ejects said package transverse to the longitudinal direction of the conveyor belt such that any packages that are outside the tolerance are taken out of line automatically. The same applies to checkweighing products in general.

In some cases, the checkweigher is used in combination with a metal detector and/or an X-ray machine to enable other aspects of the product to be checked and rejected if the product is found to contain contaminants. For example, in addition to the weight of an product meeting specified limits, other characteristics of the product such as the presence of contaminants are measured before the product can be considered to be fit for purpose, e.g. consumption. To achieve these measurements, typically an X-ray machine and/or metal detector are located upstream of the weigh belt so that they share the same conveyor system. Products are initially transported to an X-ray machine and/or a metal detector depending on the type of contaminant to be monitored and then subsequently transported to the weigh belt. To allow different characteristics of a product to be successively monitored on a conveyor system, typically the X-ray machine and/or metal detector share the same support structure as the weigh belt, so as to allow the conveyor system to be extended into any one or both of the X-ray machine and the metal detector.

In any of these dynamic monitoring processes on a conveyor system, vibrations of any of the monitoring sensors can adversely affect the monitoring process of a product. Specifically, vibrations can lead to imprecise measurements of the weight—particularly if the vibrations cause reverberations in the weight transducer, e.g. a load cell. Such vibrations can lead to good products being falsely rejected.

Vibrations are induced from a number of sources, but particularly from an infeed belt transporting products to the weigh belt (which changes the speed of the product to bring it up or down to the speed for weighing), the weigh belt and the exit belt. Also, the pushing device and the motors for driving the conveyor apparatus provide further vibrations when in operation. In order to accurately monitor the products when on the conveyor system (particularly when on the weigh belt) to within a defined precision, the vibrations must be suppressed. To meet the European MID and other worldwide equivalents, any exposure of the load cell to vibrations must be effectively dampened to prevent the vibrations affecting the weight measurements and, consequently, the accuracy of the checkweigher. In an attempt to suppress vibrations, traditionally the support structure includes a number of dampers, fixtures and support beams which are typically resin filled. As a result, the support structure requires extensive use of specialist equipment and work force, e.g. specialist welders, to assemble the different fixtures to the support structure, not least to handle the potential chemical hazard in the use of resins or ballast material to fill the support beam. Not only can this cause a bottleneck in the production line resulting in significant downtime, but it also adds costs to the manufacturing process of the inspection apparatus. This results in a very cluttered support structure with exposed cabling having areas that are not easily accessible or which require components to be dismantled before they can be accessed. Such inaccessible areas are a harbour for bacteria.

Further to the need for a reduction of vibrations, another challenging problem with conveyor systems is the difficulty in maintaining high levels of hygiene, particularly in the case of the pharmaceutical and food industries. As the products or product packages (sometimes open to air) pass through the conveyor system at a very high rate (up to 500 products per minute in extreme cases), spillages occur which end up on the conveyor belts and the support structure of the conveyor system. Such spillages can include liquids from animal products, dairy products etc, which are a potential source of harmful bacteria if not cleaned.

Due to the strict hygiene requirements in the pharmaceutical and food industries, the support structure and the conveyor systems along with any accompanying equipment must be cleaned thoroughly and frequently. This leads to considerable down-time and causes an overall lower efficiency of monitoring the products, especially when there is a change in a product type on a production line. In addition to being able to suppress vibrations in order to comply with worldwide testing standards, the apparatus and components making up the apparatus must also be IP69K compliant or worldwide equivalent, which specifies the required protection against fluid ingress to be provided by an enclosure, when faced with e.g. high pressure water cleaning. A balance must therefore be struck between having a support structure that is easy to clean to minimise this down-time when testing food products or other hygiene-sensitive products and having a support structure that is able to significantly suppress any vibrations so that as to be compliant with strict measuring standards.

US 2006/0289277 A1 (Mettler-Toledo Garvens, GmbH) teaches a weigh conveyor and makes an attempt at solving the above problems by teaching a frame for a monitoring scale which includes a supporting part and two transverse parts by which the frame is supported on the floor. The frame includes a hollow body that may be filled with a ballast material, such as an antiseptic medium to suppress longitudinal vibrations and improve hygiene. Thus the disclosed apparatus suffers from the need to fill parts of the support frame with ballast material in order to suppress vibrations. The support frame is also crowded with fixtures and exposed cabling making the task of cleaning the weigh conveyor very time consuming and cumbersome.

Clearly, there is a need for a support structure for a check weighing apparatus comprising a conveyor system that is both easy to clean with minimum downtime compared to a traditional check weighing apparatus and does not suffer from the problems of inaccuracies in weight measurement.

SUMMARY OF THE INVENTION

The present invention has mitigated the above problem by providing a product inspection apparatus comprising:

a) a conveyor system for transporting items, said conveyor system comprising:
  i) a weigh conveyor comprising a load detector for detecting the weight of items transported on the conveyor system; and
  ii) a transport conveyor adjacent the weigh conveyor;
b) a support structure comprising a support beam;

wherein the transport conveyor is mounted to the support beam by at least one support column externally mounted to the support beam such that vibrations are suppressed by the at least one externally mounted support column.

For the purpose of the present invention, the transport conveyor represents the infeed conveyor and/or the exit conveyor. The infeed conveyor transports products to be weighed to the weigh conveyor where products are successively weighed by the weigh conveyor (associated with a load detection) and, subsequently, are transported to the exit conveyor.

Instead of filling the support beam that supports the transport conveyor with resin or ballast material (which is time consuming and cumbersome in the manufacture of the product inspection apparatus apparatus) in order to suppress vibrations (caused by the conveyor system and its associated motors), the present invention provides the solution whereby the suppression of the vibration is achieved by mounting the transport conveyor onto at least one externally mounted support column that functions to dampen the vibrations of the transport conveyor and thereby, minimise erroneous weight measurements. To provide adequate suppression of vibrations, preferably the at least one support column comprises a resilient material, e.g. plastic or rubber or a combination thereof.

Optionally, the at least one support column of the present invention doubles up as a passageway for feeding cabling therethrough. Preferably, the at least one support column comprises opposed open ends and a passageway extending between the opposed open ends of the at least one support column. The passageway provides a shield for cabling not only from external influences such as fluids but prevents them being a harbour for bacteria making them difficult or cumbersome to clean.

By not having a resin or ballast-filled support beam allows for the use of a single support beam rather than multiple support beams. This is due to the shift of the damping from internal to external to the support beam. Before this shift, the support beam was responsible for the damping and the support of the conveyor system—hence, the need for multiple support beams. Now that the damping and the support is distributed between the support beam and the support columns, a single support beam can be employed. The use of a single support beam instead of multiple support beams provides a more open structure with fewer surfaces to clean or harbour bacteria. Equally, the use of a single support beam minimizes the use of fixtures needed to assemble the conveyor system to the support beam.

By moving the damping of the vibrations from internal to the support beam to external of the support beam allows any type of beam to be employed, for example, the beam can be a non-enclosed beam such as an open-box structure provided it can provide sufficient rigidity and support to the transport conveyor. It goes against the notion that the use of an open-box structure which would generate more vibrations and therefore, would be more detrimental to the weight measurement. However, the surprising effect of the at least one externally mounted support column to suppress such vibrations has made it possible to use any type of support beam irrespective of shape provided it has sufficient structural rigidity to support the conveyor system.

The benefit of an open box structure whereby the support beam comprises an opening along its longitudinal length allows for easy cleaning access to the internal surfaces of the support beam so as to minimise downtime when the product inspection apparatus or support structure is being cleaned. This is especially advantageous in certain industries (e.g. the food and pharmaceutical industry) whereby tubular or enclosed structures are undesirable as holes or gaps provide entry for contaminants and are very difficult to remove. Moreover, the open-box structure of the support beam doubles up as a shield for cabling that can be fed along the interior of the open-box structure.

Preferably, the support beam is mounted to support legs. More preferably, the support legs is a leg hoop assembly. The combination of the single support beam mounted to a leg hoop assembly making up the support structure of the present invention, provides a more open structure that is easily accessible for cleaning and maintenance. Cleaning can be achieved by hosing down the support structure of the present invention with a high pressure water jet since a majority of the surfaces of the support structure are exposed without the need for dismantling or uncovering areas of the support structure that are not exposed.

Another source of build-up of bacteria and contaminants are cabinets and bins associated with the product inspection apparatus. If any liquids or products leak or fall, respectively, from the conveyor system onto a cabinet or bin, this can cause a large build-up of bacteria over time. The product inspection apparatus of the present invention mitigates this problem by further comprising:

i) a control cabinet housing an electronic components attached to the support structure; and ii) a reject bin attached to the support structure, wherein the outer profile of the control cabinet and/or the reject bin is shaped with a fluid run-off on all of it surfaces so as to prevent fluid from standing on any of its surface. The profile of all of the surfaces of the control cabinet and/or reject bin is/are non-horizontal such that fluids split on these surfaces run-off rather than stand and become stagnant.

Contaminants can also enter the conveyor itself from sources external to the products on it. For example, staff can drop food or drinks in the conveyor system or machinery or fasteners and associated components, e.g. screws, bolts and/or nuts, placed above the conveyor can fall into the conveyor system and onto the conveyor belt. Typically, moving parts of the conveyor system such as the moving conveyor, and a pusher assembly for removing reject products from the conveyor system are covered by a physical hood. The physical hood is pivotally mounted to the support structure and opening of the hood whilst the machinery is operational actuates an interlock to stop operation of the machinery and thereby, mitigates potential harm to a user, in particular the user's hand. However, the repeat opening and closing of the physical hood is considered to be a nuisance and has led to the hood being permanently removed from the checkweigher and replaced by warning signs exposing the dangerous moving parts. The present invention mitigates this problem by providing a conveyor system comprising a conveyor for transporting items and a hazard zone, and a safety sensor to provide an indication and/or alarm and/or disable operation of the conveyor system when the hazard zone is entered by an unexpected item. The safety sensor may comprise an optical sensor. The optical sensor may be a light guard that is configured to provide a light curtain above the conveyor and/or on one or both sides of the conveyor. The conveyor system may further comprise physical sidewalls such that the safety sensor is mounted above the conveyor. Should a user attempt to place his/her hand in the vicinity of the moving parts of the conveyor system (i.e. the hazard zone), the safety sensor would actuate a switch to stop the operation of the conveyor system and/or any other moving parts. In some options, the safety sensor is a proximity sensor and/or a thermal imaging camera that would detect the presence of an unexpected item such as a user's hand, in the hazard zone.

When cleaning electrical components, e.g. electric motors, of a conveyor system, they are ideally be IP69K rated so as to minimise the ingress of water under high pressures. However, IP69K components tend to be very expensive in comparison to lower-rated products due the use of specialised seals. Therefore, the present invention has mitigated this problem by providing a removable waterproof outer jacket for sealing an electric motor against water, said electric motor mounted to a plate having an aperture for a drive shaft of the electric motor to extend therethrough, said removable outer jacket comprising an open end for allowing the removable outer jacket to be slid onto the exterior surface of the motor; said jacket being dimensioned for fitting snugly over the motor so as to seal said motor against the ingress of water; wherein the open end of the removable outer jacket is configured for cooperating with the plate and/or electric motor to seal the opening of the removable outer jacket Optionally, the electric motor is mounted to a gearbox and the gearbox is sealed to the plate such that the removable outer jacket seals the periphery of the gear box. Equally, the motor can be mounted to the plate. In which case, the removeable waterproof outer jacket would seal the periphery of the electric motor. The removable waterproof outer jacket would not only need to be shaped to seal the outer periphery of the electric motor or gear box but also able to accommodate for any cabling or cable connection from the electric motor. Shaping the removable waterproof outer jacket with a channel to accommodate for any cabling or cable block of the electric motor would disrupt the seal around the periphery of the electric motor or gearbox and potentially provide an access for the ingress of liquids such as water. Preferably, the removable outer jacket comprises a channel for accommodating a cable of the electric motor, said channel comprises an open end that extends into the open end of the removable waterproof outer jacket, wherein the open end of the channel is sealed from the ingress of fluid by a grommet that snugly fits within the channel. Preferably, the grommet comprises a groove or slit for accommodating a portion of the cable in a snug fit. For the purpose of the present invention, the snub fit forms a seal to prevent the ingress of liquids. For example, the groove or slit in the grommet forms a snub fit with a portion of the cable from the electric motor that prevents the ingress of liquid within the groove or slit. By the use of a grommet helps to restore seal around the periphery of the electric motor or gearbox so as to prevent the ingress of liquids.

By providing a removable waterproof outer jacket for the motor casing having an open end that is configured to cooperate with a plate mounting the motor seals the motor against the ingress of water even under the action of a high pressure water hose. The open end allows the jacket to be easily slid onto the motor casing. Preferably, the jacket is composed of a resilient material that enables the jacket to stretch around the motor casing as a snug fit, e.g. as a sheath.

BRIEF DESCRIPTION OF THE DRAWINGS

Further preferred features and aspects of the present invention will be apparent from the claims and the following description of an illustrative embodiment of the inspection apparatus made with reference to the accompanying drawings. These show:

FIG. 12A-C: A schematic representation of a close-up of the motor cover and its associated components, namely a grommet.

DETAILED DESCRIPTION

Figure 1:
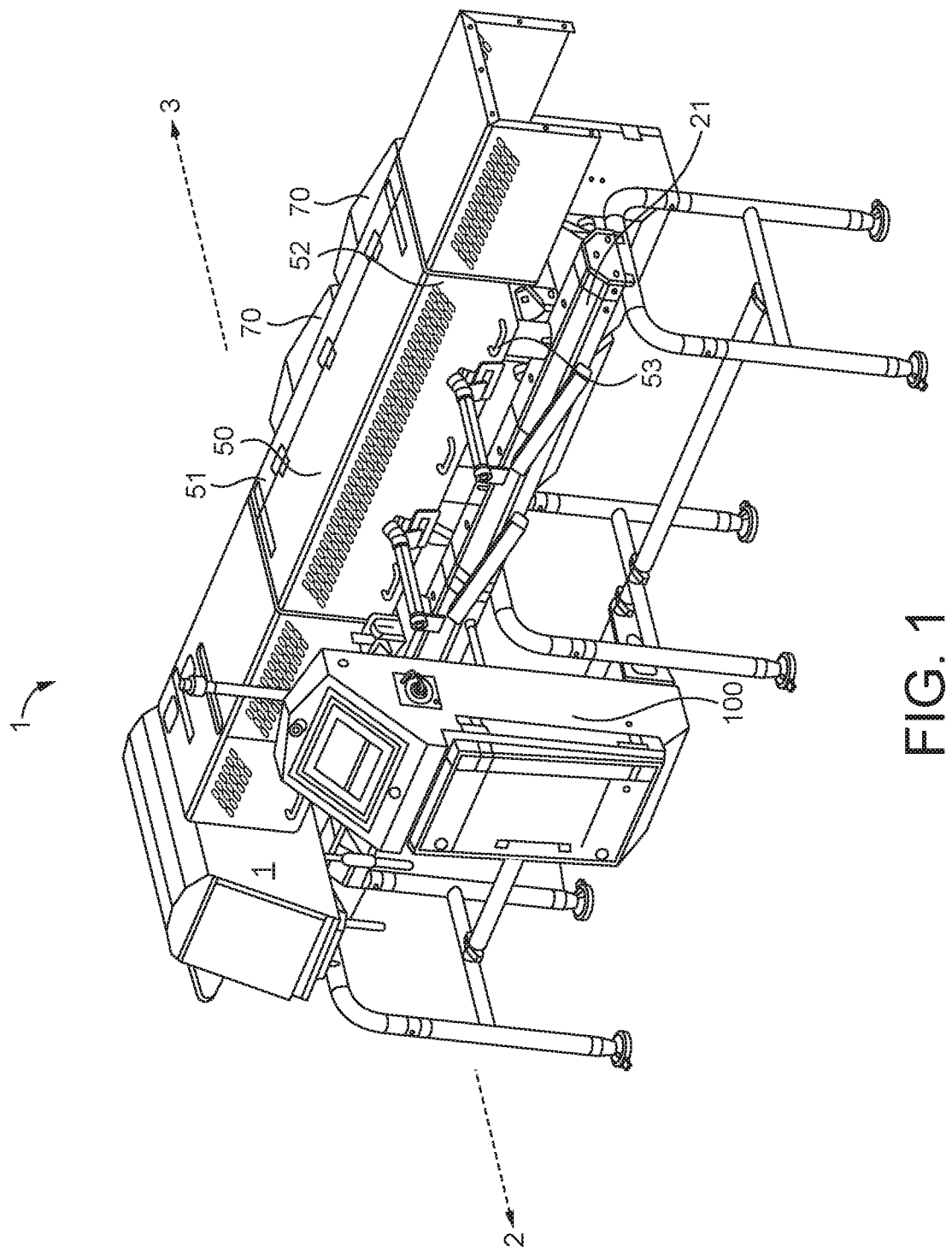
FIG. 1: A schematic perspective view of the apparatus, with a product inspection apparatus cover in place.
Figure 8:
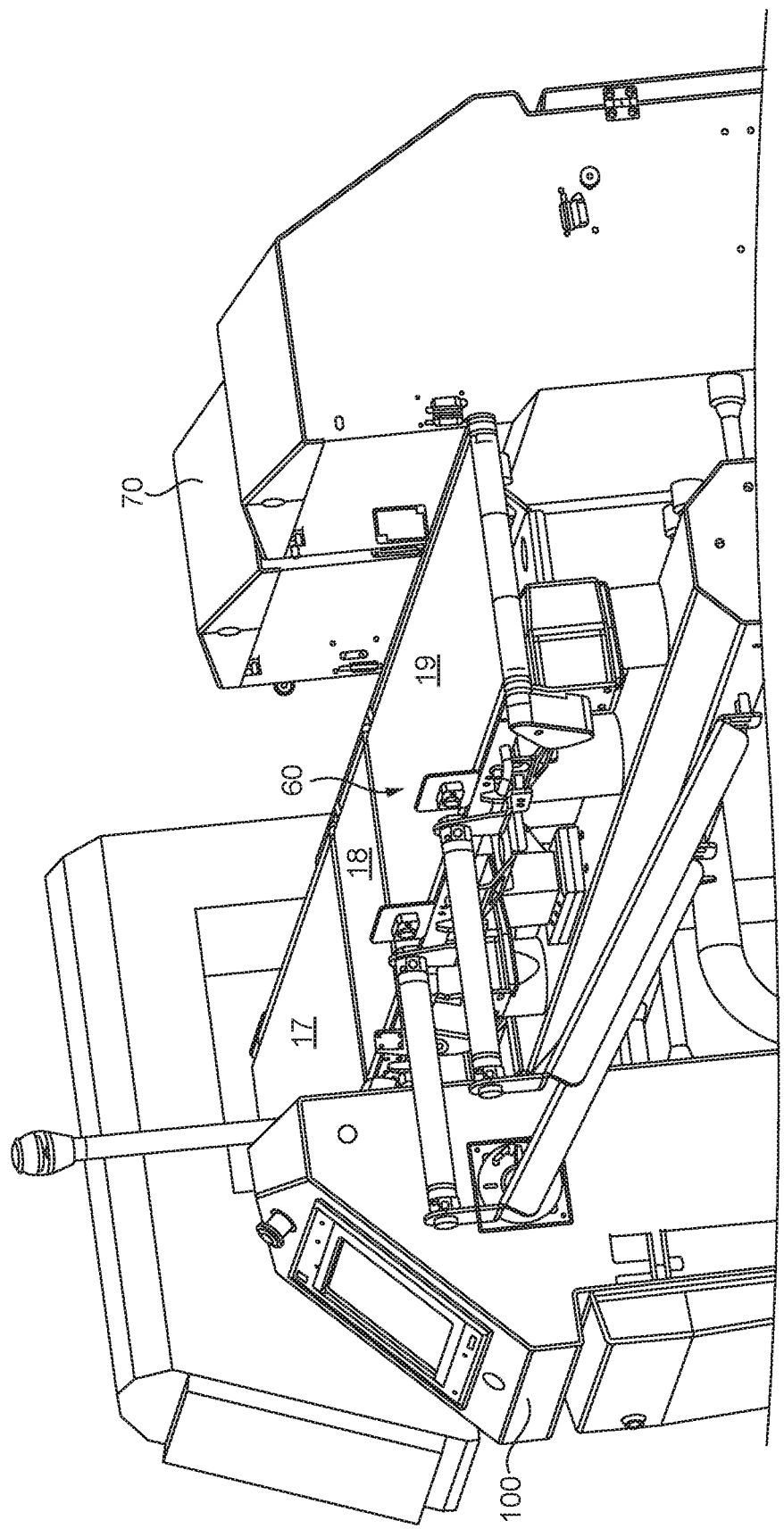
FIG. 8: A close-up schematic perspective of the conveyor system of the apparatus of FIG. 1.

FIG. 1 shows a perspective view of a product inspection apparatus 1 comprising a conveyor system for transporting products. The product inspection apparatus 1 has a forward side 2 and an aft side 3. Now referring to FIG. 2, products to be tested are transported by the conveyor system 10, said conveyor system comprises at least one conveyor bed 11 (i.e. a support surface over which the top run of the at least one conveyor or belt runs (mostly hidden in the figures)), at least one conveyor 12, and at least one electrical motor 13 to drive the conveyor system, via at least one belt 14 and a corresponding powered roller 15 around which the belt 12 is trained. As shown in FIG. 8, the conveyor system comprises a weigh conveyor 18, said weigh conveyor is supported by a load detector for detecting the weight of products transported on the conveyor system, and a transport conveyor adjacent the weigh conveyor. The transport conveyor comprises an infeed conveyor 17 and an exit conveyor 19, wherein the weigh conveyor is positioned between the infeed conveyor 17 and the exit conveyor 19 such that the infeed conveyor 17 transports products to be weighed to the weigh conveyor 18 and the exit conveyor 19 receives product from the weigh conveyor 18. The conveyor system can comprise roller conveyors and/or belt conveyors. In the case that the conveyor system is a belt conveyor system, a conveyor belt 12 is looped around rollers 15 driven by an electrical motor 13 so that the conveyor belt 12 slides across a conveyor bed 11 as the conveyor belt 12 transports product(s) along the conveyor system.

Figure 2:
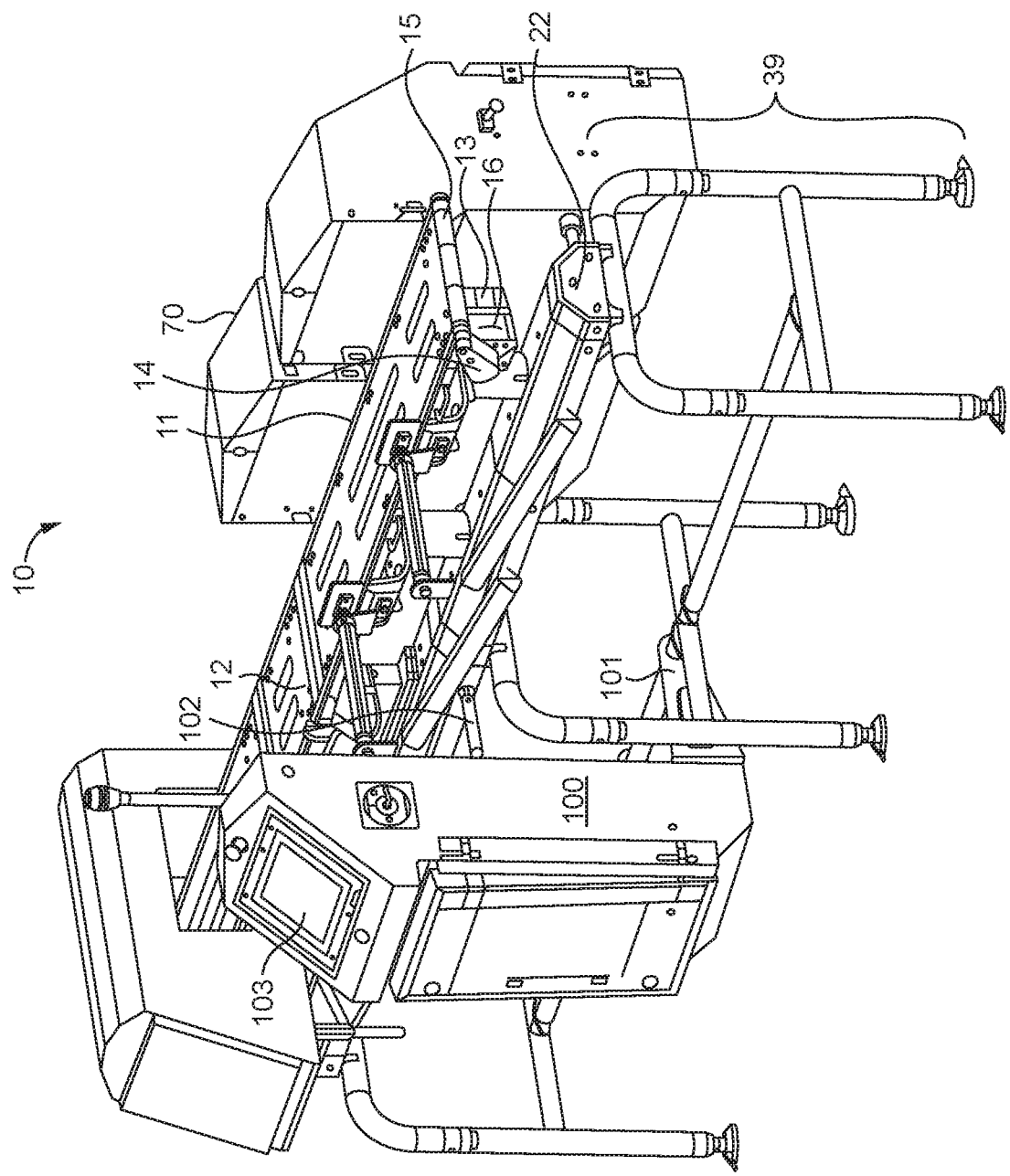
FIG. 2: A schematic perspective of the product inspection apparatus of FIG. 1, without a product inspection cover in place.

A perspective view of the conveyor system is shown in FIG. 2 and FIG. 8. As mentioned above, the conveyor system 10 comprises a weigh conveyor 18 and two transport conveyors: an infeed conveyor 17 and an exit conveyor 19. The infeed conveyor 17, the weigh conveyor 18 and the exit conveyor 19 are arranged in series so that products placed on the infeed conveyor 17 are transported to the weigh conveyor 18 and then onto the exit conveyor 19 where if they meet the required standards they proceed, or if they do not meet the required standards they are rejected. One or more reject bins 70 lie adjacent the exit conveyor 19 so that the monitored food products that do not meet the required food hygiene standards are placed in the reject bins by a pusher assembly 60. Further details of the operation of the reject bin 70 and the pusher assembly 60 are discussed below. As shown in FIG. 8, the infeed conveyor 17 transports products to be monitored through the at least one optional station, e.g. an X-ray machine and/or a metal detector to check for the presence of foreign objects or contaminants such as pieces of metal or other foreign bodies in the product. If the X-ray machine and/or the metal detector detects the presence of a foreign body, a signal is sent to a controller which actuates the pusher arm at the exit conveyor 19 to place the rejected product into the appropriate reject bin and/or alternatively an alarm is sounded to alert the user of a reject product. The weigh conveyor 18 comprises a belt type conveyor that moves products to be weighed from the infeed conveyor 17 to discharge onto the exit conveyor 19 where the products are either rejected if they are found to not to comply with the required weight etc. or continue through the production line if they do meet the required weight etc. The at least one conveyor system 10 has a forward facing side and an aft side, wherein the forward facing side is designed to be accessed by users and the aft side normally is inaccessible. As shown in FIG. 2, the at least one reject bin 70 occupies the aft side of the product inspection apparatus 1 and an electronics cabinet 100 housing the electronic components such as the processor and a display is mounted to the forward side of the product inspection apparatus 1.

The product inspection apparatus 1 further comprises a support structure 20. The conveyor system is mounted to the support structure 20 (see FIGS. 3 and 4). The support structure 20 comprises a support beam 21 and at least one support column 30. The support beam 21 resists e.g. vertical loads applied to the beam. In the example of the present invention shown in FIG. 3, the at least one station and the at least one conveyor system 10 (including the weigh conveyor 18) are mounted to a single support beam 21. The support beam 21 is raised above the floor by being mounted to at least one support leg 40 (see FIG. 3). Mounting the system 10 to a single support beam provides a more open support structure as surfaces of the support structure are easily accessible for cleaning purposes. Further details of the support structure 20 according to an example of the present invention are discussed below.

Figure 9:
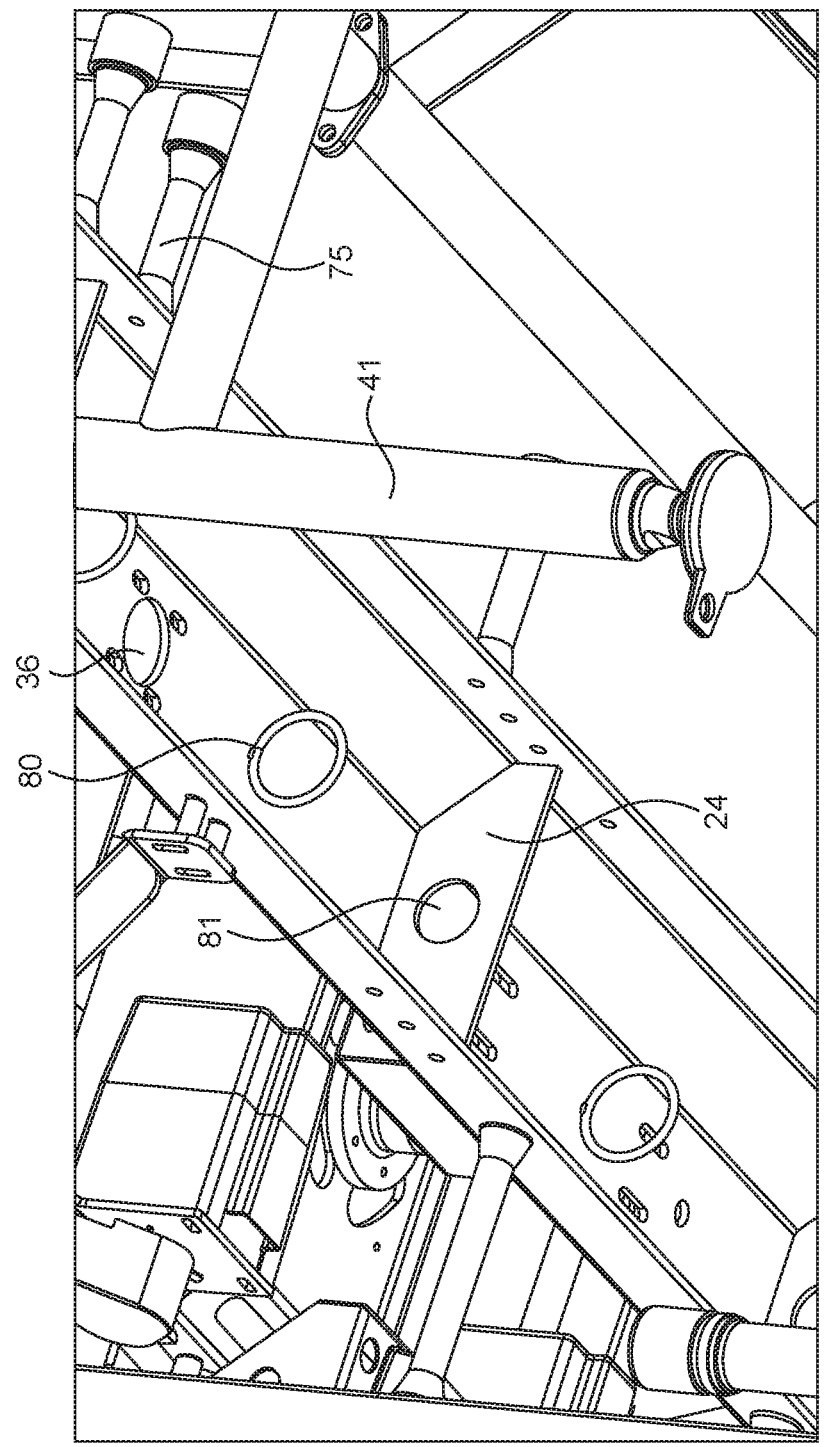
FIG. 9: A close-up schematic perspective of the underside of the support beam of the apparatus of FIG. 1.

The use of a beam having a substantially enclosed hollow interior (e.g. a tubular beam) as a support beam 21 is undesirable as any holes or breaks in the enclosure allow dirt and bacteria to enter the enclosure. The holes or breaks provide entry points for bacteria to accumulate over time within the enclosure, but restrict cleaning access making the dirt and bacteria very difficult to clean away or disinfect. The presence of dirt entry routes to the hollow beam enclosure also means that the product inspection apparatus 1 is not IP69K compliant. To mitigate this problem, the support beam 21 of the present invention does not have a substantially enclosed hollow interior, but instead is non-tubular, such that cleaning access is provided to all surfaces of the beam that could be a harbour for bacteria. In an example of the present invention, the support beam 21 is formed from a sheet of metal or other suitable material, such as a polymer or a reinforced polymer composite, with one or more bends to give the support beam sufficient structural rigidity to support the infeed and exit conveyors 17, 19, or the entire conveyor system 10 including also the weigh conveyor 18, and/or at least one station. In the particular example of the present invention as shown in the figures, the support beam 21 is a single support beam such that the conveyor system is mounted to the single support beam. In some options, two or more support beams may be laid in parallel so as to allow the conveyor system to be mounted on the two or more support beams. The support beam 21 may have an inverted channel (e.g. inverted U) shape so as not to accumulate dirt and spillages and to provide good access for cleaning all surfaces of the beam. The beam, as shown in the figures, comprises a transverse cross-sectional profile that adopts a semi-octagonal shape. However, the cross-sectional profile is not necessarily limited to the embodiment shown in the drawings, and can instead adopt e.g. a U- or C-shaped profile having a semi hexagonal shape; or any other shape that provides sufficient structural rigidity to support at least one transport conveyor and, optionally, the weigh conveyor and/or at least one station. The inverted channel shape of the beam also provides shielding for cabling and/or pipes to run along the underside of, and optionally within, the support beam 21 as shown in FIG. 9. In some options of the present invention, the profile shape of the support beam 21 can adopt an "I" or "H" or "T" shape. An "H" beam would be less desirable than an "I" or "T" beam as it provides a channel for potential dirt or contaminants to accumulate. In other options of the present invention, the transverse cross-sectional profile 22 of the support beam 21 is a portion of a circle, for example, a semi-circle. In this case, the side of the support beam 21 at the flat side of the semi-circle profile is open such that the beam 21 is channel-shaped along its longitudinal axis Y-Y, rather than tubular (see FIG. 4). Ideally, the non-enclosed portion of the support beam 21 is on the underside of the support beam 21 such that cleaning the beam is possible from either the forward or aft side of the product inspection apparatus 1, and the concave part of the beam profile is shielded from falling debris. In some options, the non-enclosed portion of the support beam 21 is on the forward and/or aft side of the product inspection apparatus 1. In other options, the beam profile 22 of the support beam is any known polygon, e.g. a trapezium, a square or a hexagon or a portion of any of these. In such case, the section of the beam 21 profile of at least one of the sides of the polygon of the profile 22 remains open so that the beam is channel shaped rather than tubular. The support beam 21 may further comprise a closure wall 23 at each end. The support beam 21 may comprise metal, in particular steel and/or any other metal.

The support beam 21 may comprise one or more reinforcement plates 24 (as shown in FIG. 9) spanning the channel interior to further strengthen and stiffen the support beam. The reinforcement plates 24 may be dimensioned to fit within the internal profile of the support beam 21. The reinforcement plate 24 is attachable to the support beam by any known technique, e.g. welding, adhesives, bolt(s), screw(s) etc. Whilst it is not essential to mount the transport conveyor(s) etc. to a single support beam (as these can be mounted to multiple support beams), mounting the transport conveyor(s) etc. to a single support beam has the advantage of providing a more open support structure or framework for the product inspection apparatus 1, thereby reducing the number of fixtures needed for fixing the supported components to the support structure 20.

In some options of the present invention, the support beam 21 comprises at least one pilot and/or tapped hole for other components to be attached, e.g. brackets, mounts, struts for other components of the product inspection apparatus 1.

The support beam 21 can be formed as an integral body, e.g. a single sheet of metal with one or more bends to form the channel, or by extrusion. Alternatively, the support beam can be formed from a plurality of panels joined together (e.g. by welding) so as to make the channel.

Figure 4:
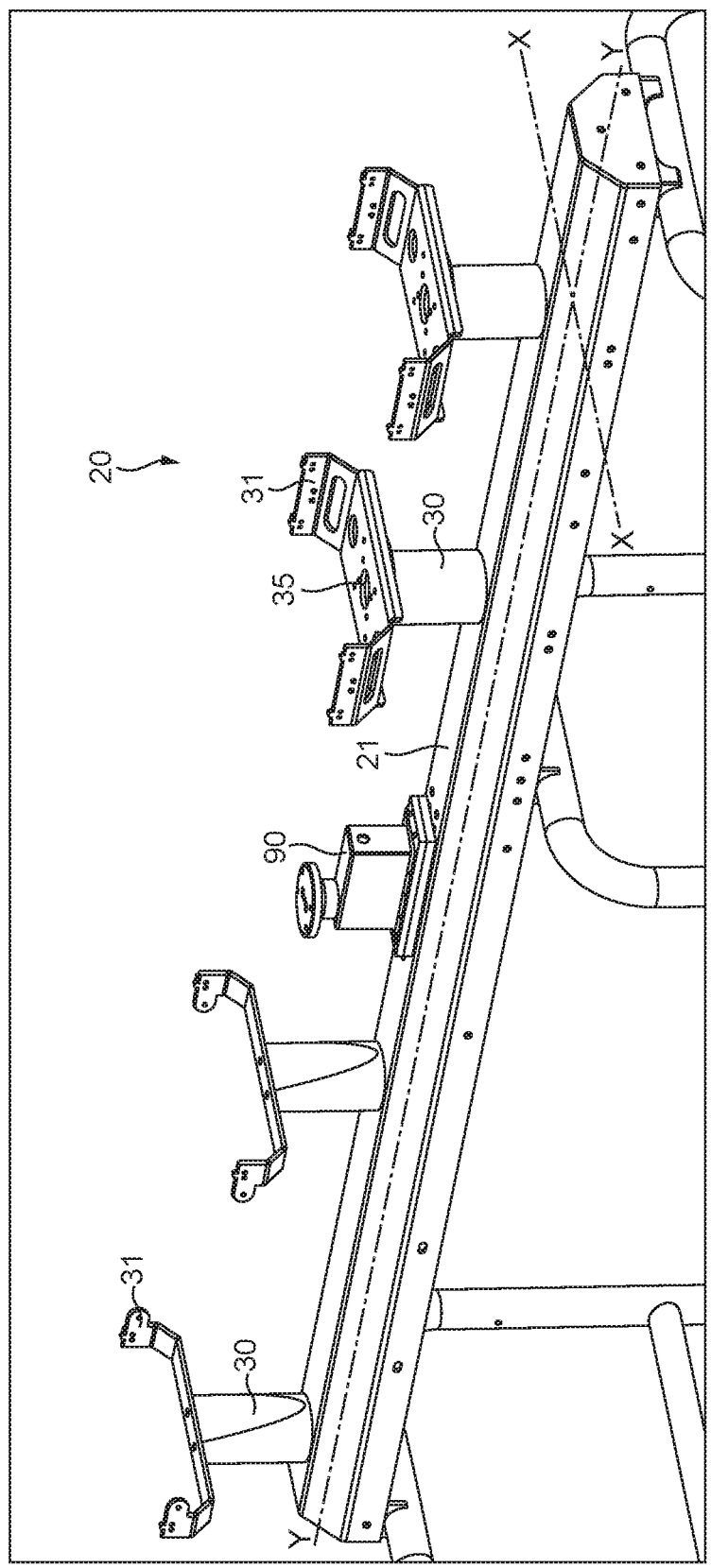
FIG. 4: A schematic perspective of the support beam and support columns of the apparatus of FIG. 1.
Figure 5:
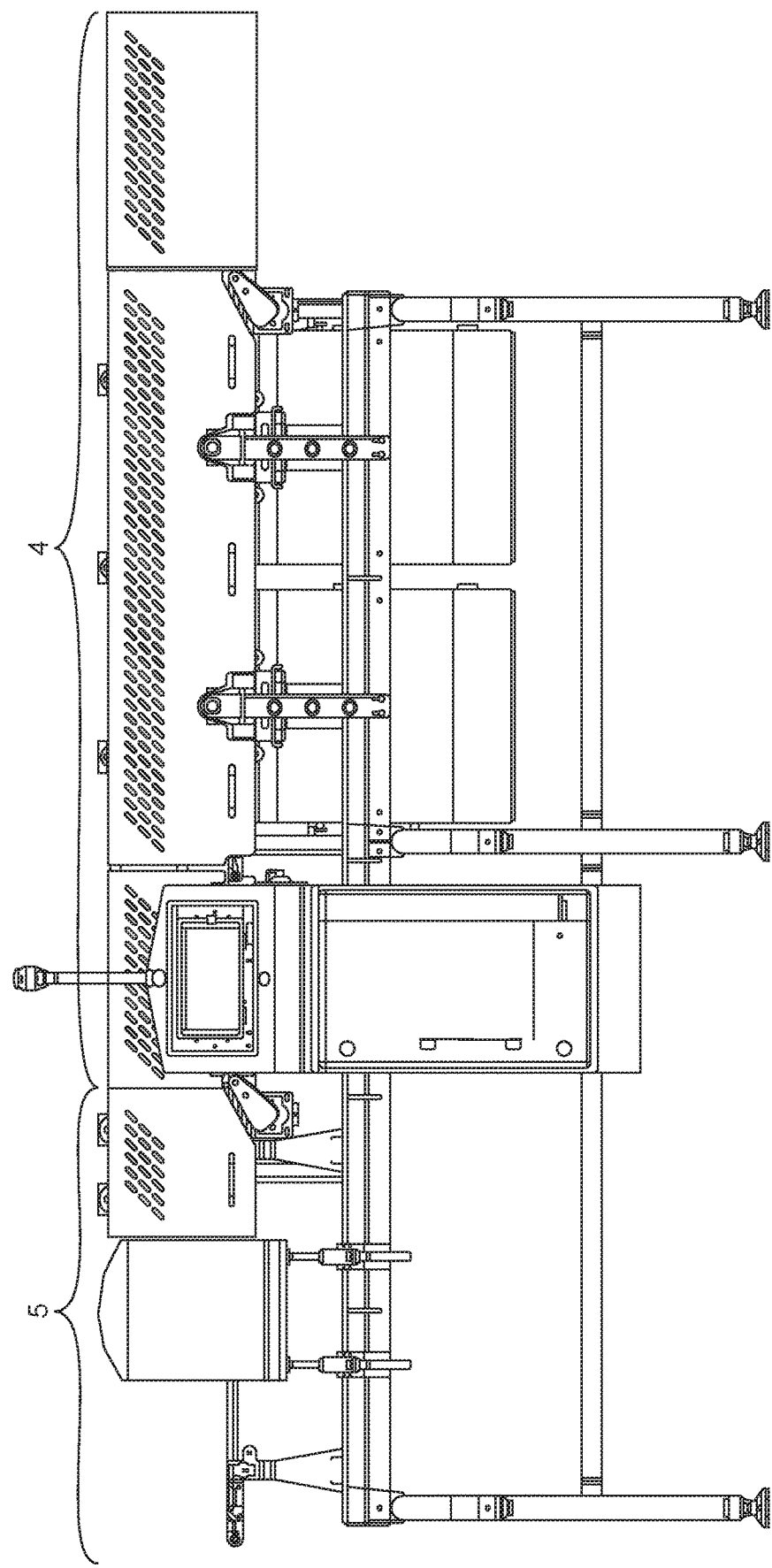
FIG. 5: A schematic side view of the product inspection apparatus with a cover.

The transport conveyor(s) 17/19 (and optionally other components of the product inspection apparatus) is/are mounted to the support structure 20 by at least one support column 30 externally mounted to the support beam 21. Specifically, the transport conveyor(s) of the conveyor system 10 are mounted to the support beam by at least one support column 30 externally mounted to the support beam 21 such that the vibrations are suppressed by the at least one externally mounted support column 30. The at least one support column 30 acts as a shock absorber and/or damper to absorb shocks and/or vibrations caused by the transport of product(s) on the supported conveyors and/or the associated motors 13. In comparison to filling hollow sections of the support beams with resin or ballast to suppress vibrations, as is customary in the prior art, which is cumbersome and can be a potential health hazard, similar or even superior suppression of vibrations is achievable by mounting the transport conveyor to an e.g. non-tubular support beam 21 by at least one support column 30 externally mounted to the support beam 21 that functions to dampen vibrations. In order to be effective as a shock absorber and/or damper, the at least one support column 30 may comprise plastics material, for example, ABS. The at least one support column 30 is positionable between the support beam 21 and a transport conveyor of the conveyor system 10. In comparison to the infeed conveyor 17 and the exit conveyor 19 which are mounted to the at least one support column 30, and as shown in FIG. 4, the weigh conveyor 18 may be mounted onto a weight transducer or load cell 90 (or a housing for said weight transducer or load cell) that is externally mounted onto the support beam. The weight transducer or load cell 90 detects weight of products that are successively transported by the weigh conveyor 18.

Figure 3:
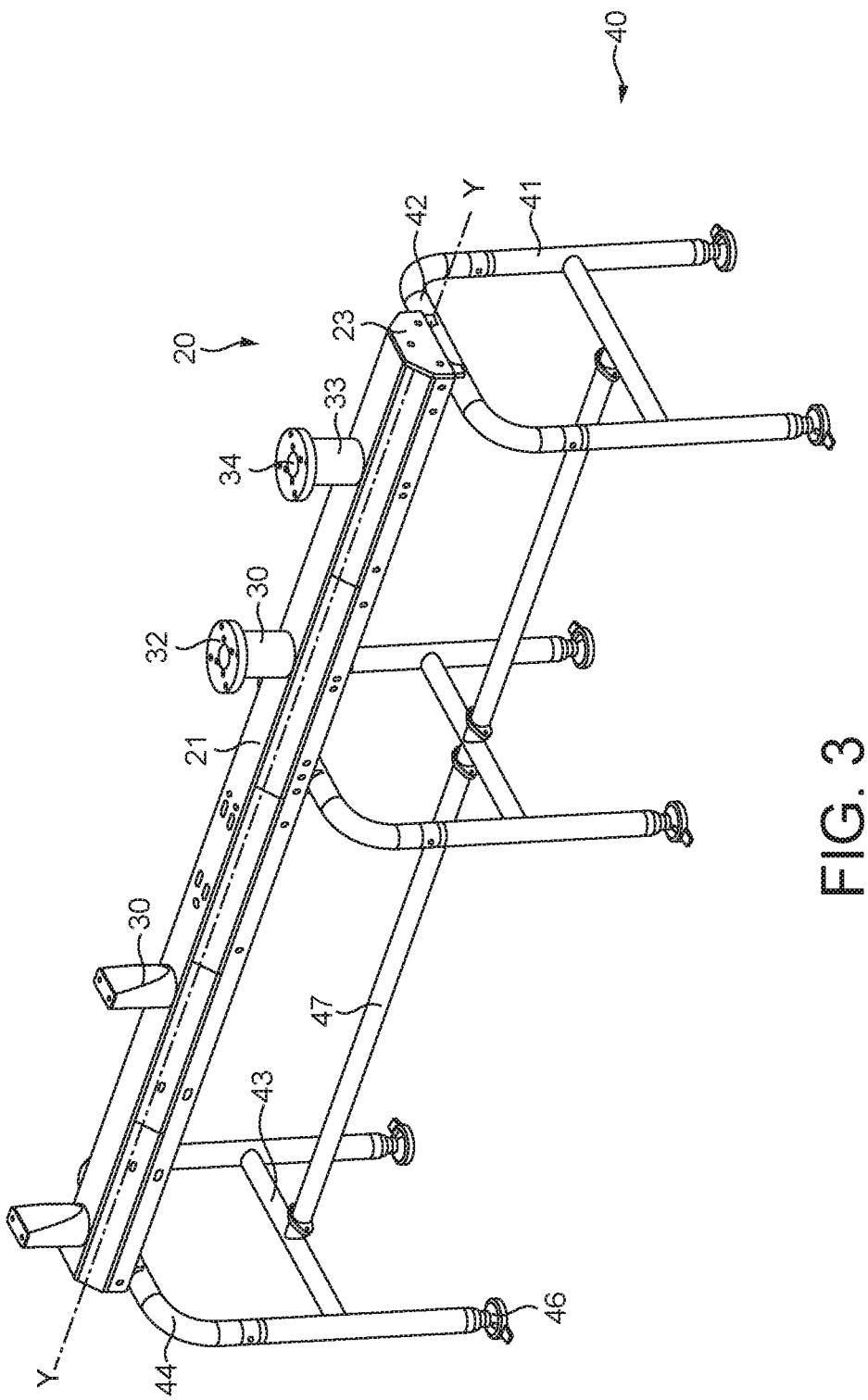
FIG. 3: A schematic perspective of the support structure of the apparatus of FIG. 1.

As shown in FIG. 3 and FIG. 9, one or more of the support column(s) 30 may comprise a through-going axial passageway 34 from the top surface 32 to the bottom surface 33 to feed wiring/cables to the underside of the support beam and thereby shield the cables, particularly electrical cabling, from any external cleaning liquids such as high pressure water cleaning without damage to the cabling; fulfilling ingress protection (e.g. IP69k) requirements. Moreover, the passaged support column 30 and the channel-like structure of the support beam 21 shields the cabling from dirt and liquids such as blood etc from food products on the conveyor system 10 which might otherwise drip or fall onto the cabling and become a harbour of bacteria such as listeria. Exposed cabling is very time consuming to clean individually, particularly if the cabling is bunched together and, in some cases, cleaning of the surface of the cabling cannot be fully guaranteed which results in bacteria being present on inaccessible or hard to reach areas of the cabling. In some cases, strong cleaning products are used to ensure that the product inspection apparatus 1 (including the cabling) is clean and free from any harmful bacteria and, thereby, does not present a danger to the hygiene of any products on the conveyor system 10. However, the use of such strong cleaning products can be corrosive to the product inspection apparatus 1 such as the conveyor system 10, motors used to drive the conveyors, the sensor and/or load cell used to measure the weight of products. Not only does the externally mounted support column 30 function to dampen vibrations of the conveyor system 10, but the support column 30 can double up as a housing for the cabling fed therethrough. By feeding the cabling through the passaged support column(s) 30 and underneath and/or within the channel structure of the support beam 21 shields the cabling from the external environment and therefore, permits the support structure 20 of the present invention to achieve the desired cleanliness using less aggressive cleaning chemicals or even water, which is less damaging to the exposed components of the product inspection apparatus 1.

A support bracket 31 may be employed to attach the at least one support column 30 to the conveyor system 10 (for example the transport conveyor(s) 17, 19). As shown in FIG. 4, the support bracket 31 comprises a plate with a flat surface, wherein the flat surface comprises a means for attaching the plate to the support column 30. The attaching means may further comprise at least one screw, or bolt, or other releasable fastener, and/or welding, and/or adhesives (e.g. tape, glue, cement etc). In addition to the flat surface, the support bracket 31 comprises two arms on opposite ends of the flat surface (i.e. one arm on each end) that can connect to the forward and aft sides of the conveyor bed 11. The two arms of the support bracket 31 may be substantially perpendicular to the flat surface of the plate. The bracket 31 may be formed as a single body and the arms formed by upwardly bending opposed ends of the single body, e.g. a metal plate. Alternatively, the arms may be affixed to the plate of the support bracket 31 by way of any one of screws, bolts, welding, rivets or any other affixing means known in the art.

As shown in FIG. 4, the at least one support column(s) 30 may have minor differences in their form or arrangement depending on e.g. whether the at least one support column 30 is supporting the infeed conveyor 17 or the exit conveyor 19 and whether the support column 30 houses the cabling. In the particular example shown in FIG. 4, the support column 30 supporting infeed conveyor 17 is of a different shape to the support column 30 supporting the exit conveyor 19 and is largely dependent on the ability of the at least one support column 30 to house the cabling. In the particular example shown in FIG. 4, the support column 30 supporting the exit conveyor 19 is hollow to allow cabling to be fed therein. However, different or similar support columns 30 can be used to support the infeed conveyor 17 and the exit conveyor 19. For example, at least one passaged support column 30 can be used to support the infeed conveyor 17. The arrangement of the support columns 30 will largely depend on whether the support column 30 is used to feed the cabling to the underside of the support beam 21. To permit the cabling to be fed into the support column, the support bracket 31 may comprise a corresponding aperture 35 aligned with the passageway 34. Equally the support beam 21 may comprise a corresponding aperture 36 aligned with the corresponding passageway 34 to allow cabling to be fed to the underside of the support beam (see FIG. 9). The cabling run along the underside of the support beam 21 is shielded from above from any dirt or liquids falling from a conveyor.

Figure 10:
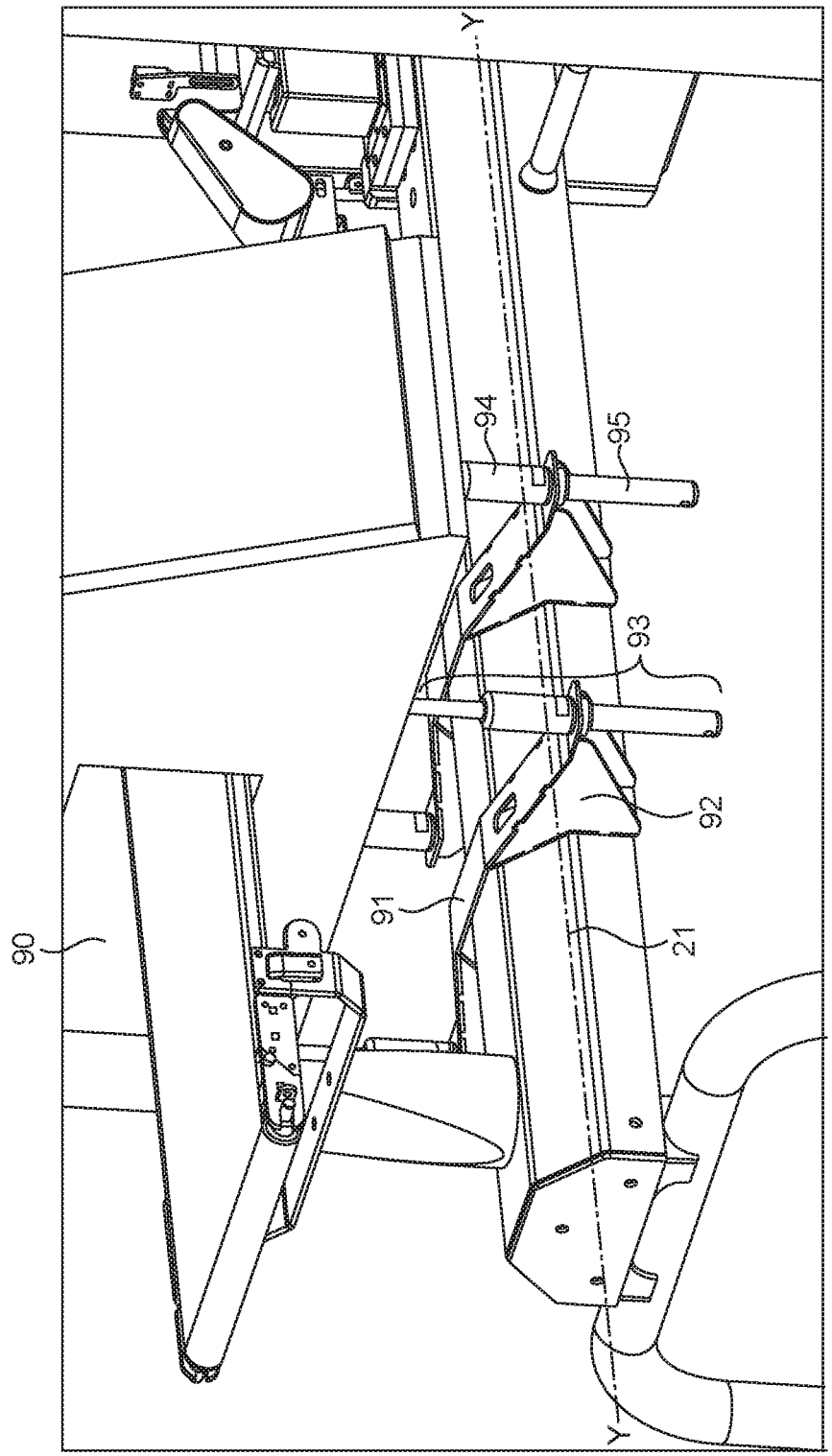
FIG. 10: A close-up schematic perspective of a metal detector station of the apparatus of FIG. 1.

The at least one optional station (e.g. metal detector head and/or X-ray machine) may be mounted to the support beam 21 by means of at least one mounting saddle 91 (FIG. 10). The mounting saddle 91 is formed to fit the periphery/transverse profile 22 of the support beam 21, so as to allow the mounting saddle to slide along the length of the support beam 21 before being secured at the desired longitudinal position. The mounting saddle 91 comprises an outward extension 92 on either side, extending perpendicular to the longitudinal axis Y-Y of the support beam 21, for mounting the at least one station thereon. The extension 92 comprises an aperture to receive a height adjustment component 93. The height adjustment component 93 comprises a rod 94 and a rotatable outer sleeve 95. The rod is threadingly received in the outer sleeve 95. The advantage of the height adjustment component is that it allows for a user to adjust the height of the at least one optional station by hand rather than necessitating the use of tools, such as a wrench or spanner. The at least one station rests on the one end of the rod 94 such that rotation of outer sleeve adjusts the height of the at least one station. To make adjustments to the height of a station, the user can simply rotate the rotatable outer sleeve 95. However, the reverse is possible where the station rests on the sleeve. Typically and as shown in FIG. 10, each station is supported by at least two mounting saddles 91 and each mounting saddle 91 carries two adjustment components 93 for support each corner of the station. The height and levelling of the station can be adjusted by adjusting the height of each of the four height adjustment components 93.

It is common practice that cables for the motors and other electrical components of the system are bundled together and secured to the support structure 20 using cable ties. Excess lengths of the cable ties are then cut leaving a sharp edge. These sharp edges pose a health & safety risk in that they may graze or puncture the skin of a maintenance person that is wiping down the cables (wiping down the cables is necessary to meet the stringent hygiene requirements of certain industries, e.g. the food or pharmaceutical industry). Therefore, as an alternative to cable ties, rings 80 are strategically fixed by way of welding or adhesives, or any other suitable technique, at various locations on the support structure. For example, as shown in FIG. 9, rings 80 are fixed to the underside of the support beam 21 within the channel structure of the support beam. Cabling fed through the at least one support column 30 is held within the interior of the channel and is therefore shielded from the external environment by feeding the cabling through the rings 80 fixed to an interior wall/surface of the support beam. Any cable(s) that would normally be tied down along product inspection apparatus 1 via cable ties may now be fed through the at least one ring 80. The reinforcing plates 24 may similarly or alternatively be provided with cable feedthrough holes 81.

The support structure 20 may further comprise support legs 40 to raise the support beam 21 to a working level above the ground. The loads applied to the support beam 21 (via the at least one support column 30) result in reaction forces at the beam's support points. The support beam 21 comprises at least two support points at which the support legs may be attached. The support legs 40 may be in the form of a leg hoop assembly 39 (as shown in FIG. 2). The combination of the support beam supported by at least two leg hoop assemblies, preferably at opposing ends of the support beam, makes for a more open support structure 20 or framework with minimal concealed surfaces so as to allow easy access for high pressure water jets and/or cleaning brushes to all of the exposed surfaces of the support structure 20 that are a potential harbour for bacteria without the need to dismantle components from the support structure 20—thereby minimising downtime of the product inspection apparatus 1.

Each leg hoop assembly comprises a "U"-shaped frame, with two e.g. parallel leg struts 41 reinforced by at least one connecting strut 43 so as to connect one leg strut 41 to the other, as best seen in FIG. 3. The at least one connecting strut 43 may be connected to the two leg struts 41 by welding, adhesives, screws and/or bolts, or any other suitable technique known in the art. In some options, the leg hoop assembly may be formed as a unitary piece. In some options, at least some of the struts and joints may be tubes or cylinders or bored. The support legs 40 comprises a metal, e.g. steel or any other metal. Alternatively, or additionally, the support legs 40 may comprise a plastics or composite material.

The leg hoop assembly may further comprise at least one foot 46 at the free ends of the leg struts 41 such that each leg strut 41 is lifted off the ground by said foot 46. The foot 46 may be height and/or angle adjustable. In some cases, the at least one foot 46 may be a wheel or ball so as to the make the product inspection apparatus 1 mobile.

As an alternative to the support legs 40, each of the support points may be in the form of any suitable load-bearing structure such as a pier or wall, another form of support frame or trestles, or suspension rods, chains or cables hung from an overhead support.

In the case where a metal detector and/or X-ray station is used in combination with the product inspection apparatus 1, the metal detector and/or the X-ray machine and/or the weigh conveyor 18 can share the same support structure 20 as the transport conveyor(s) 17, 19. The metal detector and/or X-ray machine can be configured so as to be positioned on either an infeed conveyor 17 and/or an exit conveyor 19, or on a separate conveyor altogether. Two or more support legs 40 allow for the support structure 20 to be used for a combination system as a plurality of transport conveyors (e.g. each with their own station) may be supported. For example, at least two leg hoop assemblies may be used to support a plurality of stations along with the weigh conveyor 18, e.g. an X-ray machine and/or a metal detector 5. In the particular example shown in FIG. 1, the support beam accommodating both the conveyor system 10 and the metal detector 5 are supported by three leg hoop assemblies. An additional station (also referred to as a combination system), e.g. the addition of a metal detector 5 to a weigh station (e.g. the weigh conveyor 18), may require additional, or alternative, support structure components, e.g. a longer support beam 21 and/or a third leg loop assembly. A longer support beam can either be a unitary support beam or a series of support beams aligned and/or joined end to end (and of the same or varying sizes).

The leg hoop assembly may have a height between 775 mm to 825 mm or between 825 mm to 925 mm or between 925 mm to 1125 mm. Each component of the leg hoop assembly (e.g. the leg struts 41, the connecting struts 43, elbow pieces 44 (FIG. 6), etc.) may be affixed to one another by any suitable known means, e.g. using bolts, screws, elbow pieces, welding and/or adhesives.

Figure 6:
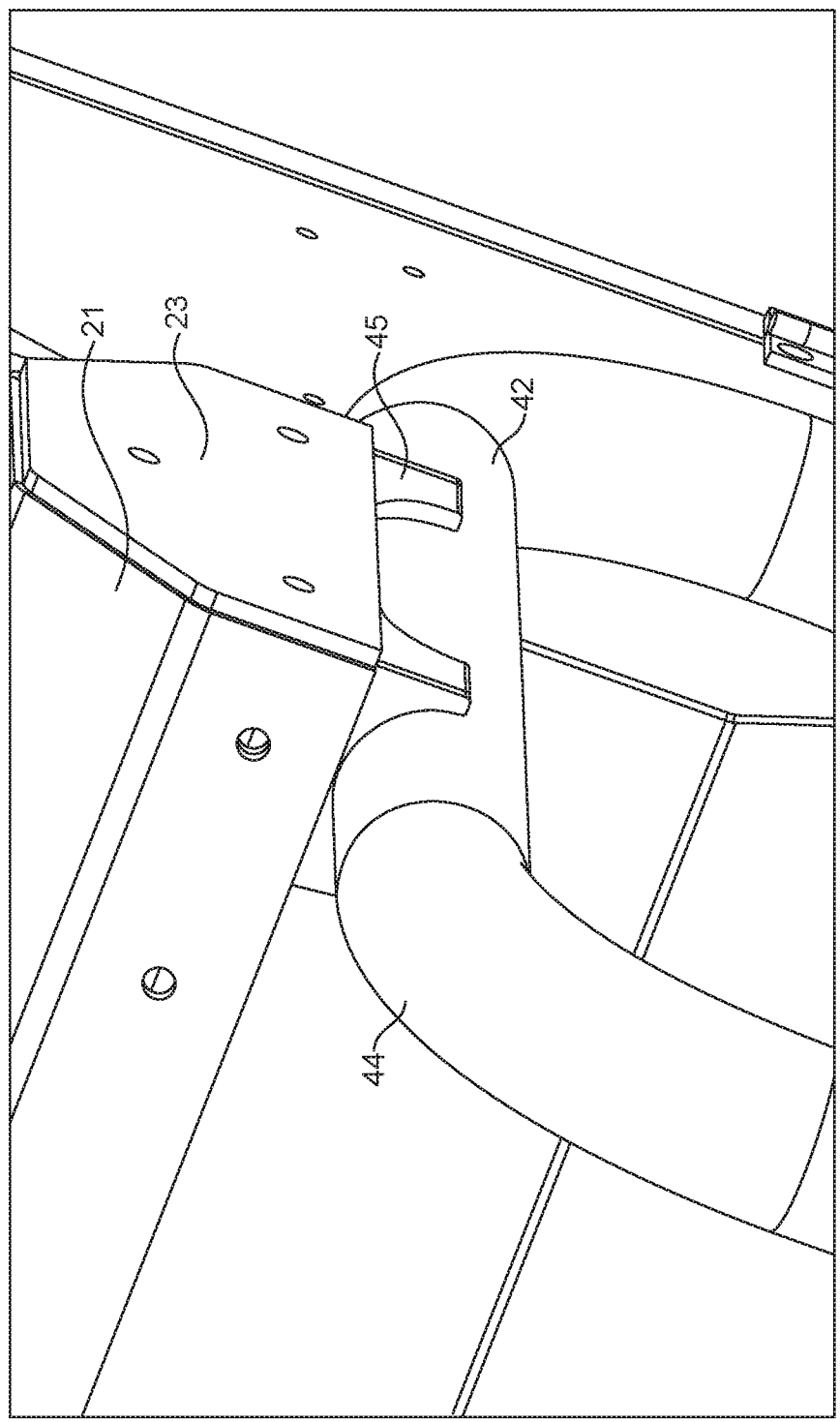
FIG. 6: A close-up schematic perspective of the leg hoop bracket of the apparatus of FIG. 1.

As shown in FIG. 6, an end the support beam 21 rests on one of the leg hoop assemblies, in particular the upper portion of the U-shaped bend of the leg hoop assembly, by means of a bracket 45. The bracket comprises a recessed portion that is shaped to correspond to the outer shape of the leg hoop assembly so as to prevent lateral movement at the upper end of leg hoop assembly relative to the support beam. The bracket 45 may be affixed to the support beam 21 and leg hoop assembly by any known means, e.g. screws, bolts, U-bolts, welding etc. In some options, the recess in the bracket may be attached to the connecting strut 42 of the leg hoop assembly by any known means, e.g. welding, adhesives etc. In other options, the recess in the plate may simply rest on or near the connecting strut 42.

The support legs 40 for supporting the support beam are spaced apart along the length of the support beam 20 and are connected together by a cross-support or rail 47 (FIG. 3). The rail 47 extends along the longitudinal axis Y-Y of the support beam 21 and restrains lateral movement of the leg hoop assemblies relative to one another. The rail 47 together with the brackets 45 that hold the support legs 40 together provide a sturdy frame, and yet form an open structure to permit easy cleaning.

Figure 11A:
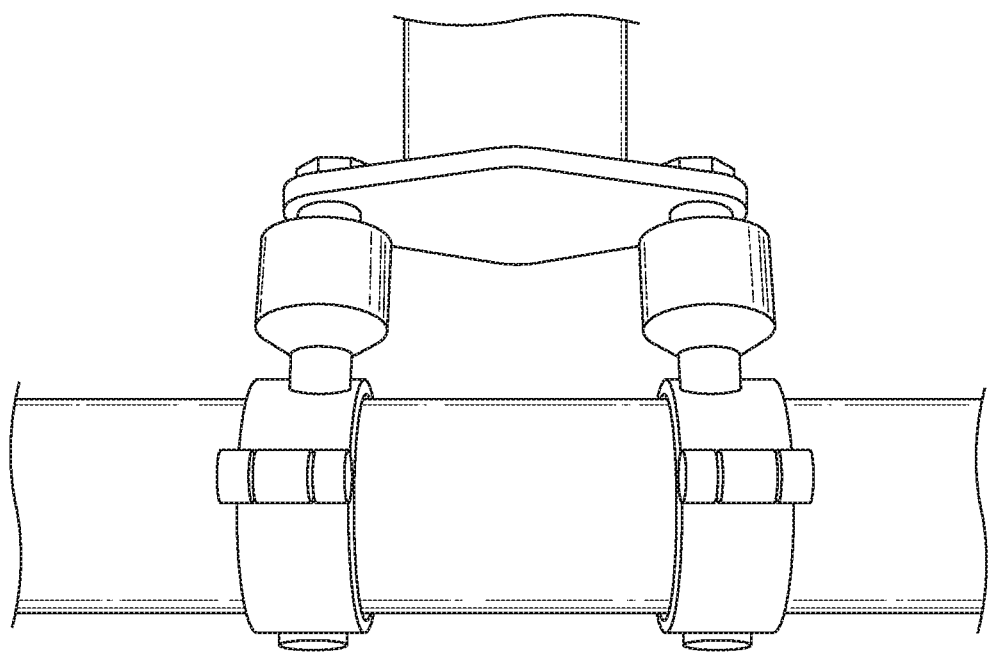
FIG. 11A: A close-up of a type of joint for the leg supports and a connecting rail of the apparatus of FIG. 1.
Figure 11B:
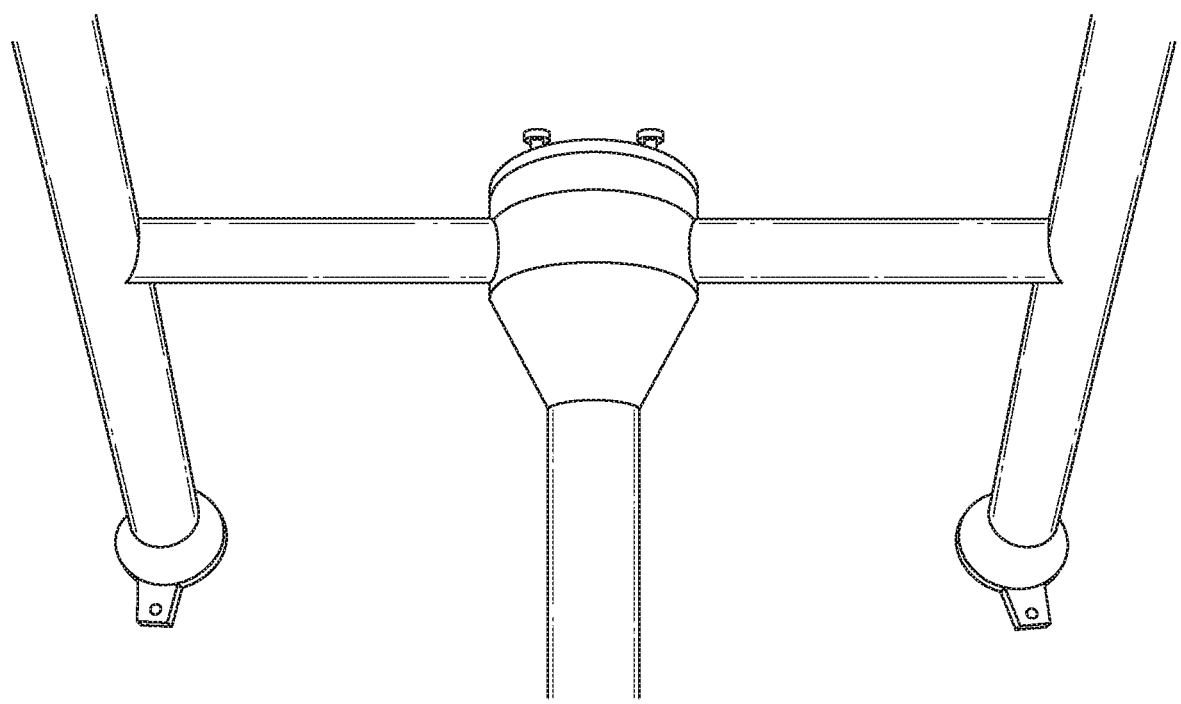
FIG. 11B: A close-up of another type of joint for the leg supports and rail of the apparatus of FIG. 1.

Any suitable means known in the art can be used to affix the rail 47 to the leg hoop assembly. In the particular example shown in FIG. 3, the leg hoop assembly is attached to the rail by means of abutting flanges. Holes in the flanges permit the rail to be attached to the leg hoop assembly by means of one or more bolts. Such a connection reduces the need to use welding to assemble the different parts of the support 20 together. Welding metal tubing not only requires specialist equipment but also specialist labour. Connecting the different parts of the support structure by one or more bolts removes the need to have specialist tooling and labour. Different examples of types of joints which can be used to connect the leg hoop assemblies and rail ends together without the need to weld the parts together are shown in FIGS. 11A and 11B. The joint shown in FIG. 11A comprises at least one joint onto which the flange at the rail end may be attached. The joint may be attached to the connecting strut 42 of the leg hoop by way of at least one clamp or welding or any other suitable known techniques. The at least one joint may be attached to the end flange of the rail 47 by any technique known in the art, e.g. bolt(s), screw(s), and/or adhesives, etc. Whilst the joints shown in FIGS. 11A and 11B remove the need to weld the parts together, welding can still be used to fix the parts together.

Products, or packaged products, that do not meet predetermined quality control requirements, e.g. determined by weight or the presence of a foreign body, are rejected. The reject products are removed from the products in the production line and collected in one or more reject bins 70 (FIG. 7) mounted to the support structure 20. To suppress vibrations, the mounting of the one or more reject bins 70 and/or the electronics cabinet 100 to the support structure 20 can include a resilient member, e.g. rubber.

The product inspection apparatus 1 comprises at least one pusher assembly 60 mounted to the support beam 21. The pusher assembly is positioned at the exit conveyor 19 and is used to push the reject product sideways across the direction of conveyor movement into a corresponding reject bin 70. The pusher 61 may be a pneumatic pusher comprising a pneumatic cylinder or a hydraulic pusher comprising a hydraulic cylinder. In some options, the pusher 61 comprises a piston and an optional pusher plate 62. Either or both of the pneumatic and hydraulic cylinder operate to produce a force (via the piston) in a direction transverse to the conveying direction and towards a mouth of the corresponding reject bin 70, so as to provide contact between the pusher plate 62 or piston rod and a reject product on the conveyor 19 which pushes the rejected product into the mouth of the reject bin.

The pusher assembly and the corresponding reject bin are positioned downstream of the weigh conveyor 18 and the at least one station if the weigh conveyor is used in combination with an X-ray machine and/or metal detector. If the X-ray machine and/or the metal detector detects the presence of a foreign body, or if the product weight is out of tolerance, a signal is sent to a controller which actuates the corresponding pusher assembly at the exit conveyor 19, to place the rejected product into the appropriate reject bin.

The pusher assembly(ies) 60 may be positioned on the forward side of the product inspection apparatus 1, with the reject bin(s) 70 positioned on the opposite aft side of the product inspection apparatus 1 (or vice versa).

Figure 7:
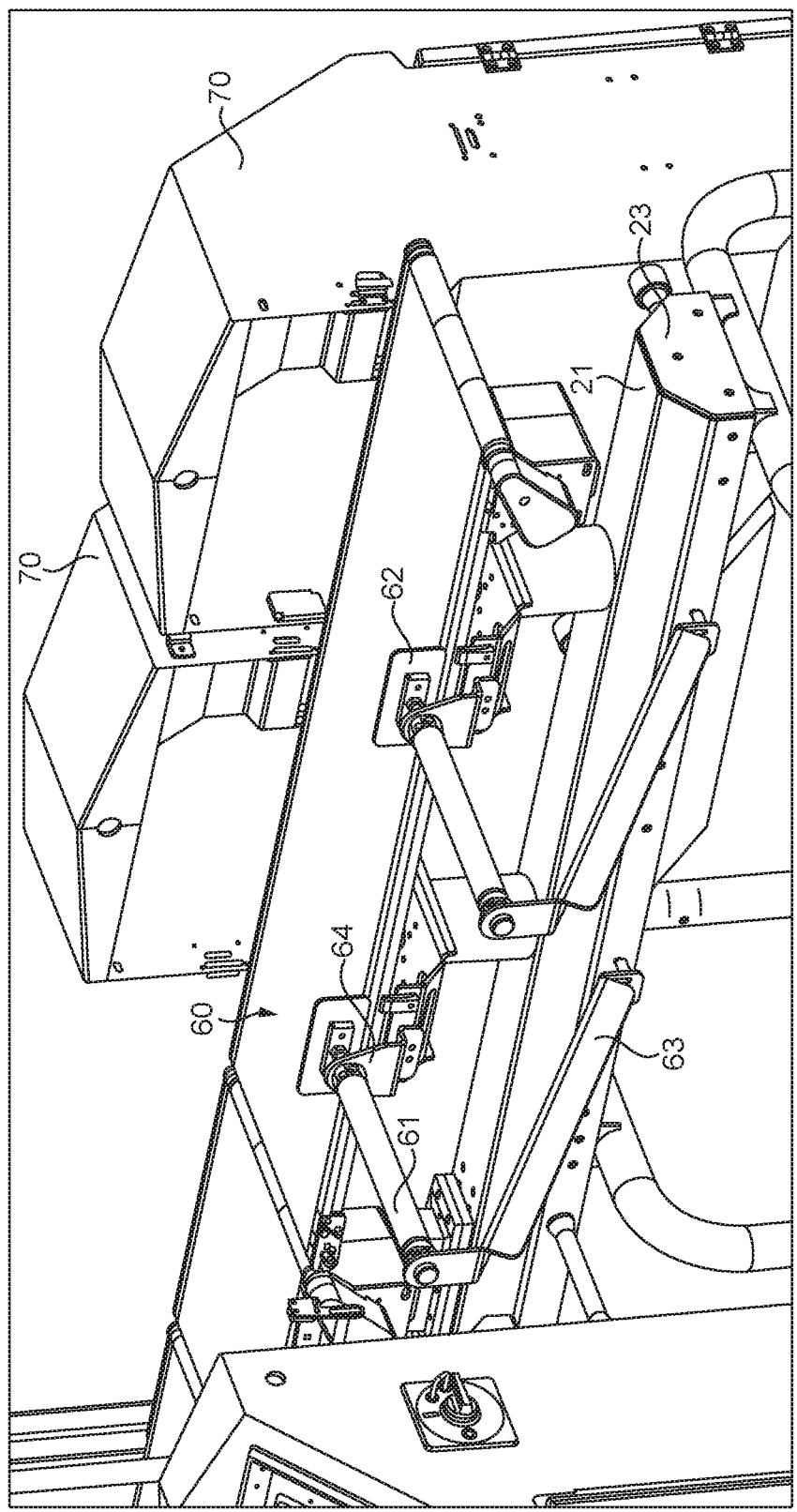
FIG. 7: A close-up schematic perspective of the pusher assembly of the apparatus of FIG. 1.

The pusher assembly(ies) 60 is/are mounted to the support beam 21 by respective first pusher cylinder mounting bracket(s) 63 (FIG. 7). One end of the or each first pusher cylinder support bracket 63 is affixed to the support beam and the other end of the or each first pusher cylinder support bracket 63 is affixed to the rear end of a respective pusher cylinder 61. The forward end of the or each pusher cylinder 61 is attached to a corresponding one of the transport conveyor support bracket(s) 31 by a second pusher cylinder support bracket 64. The second pusher cylinder support bracket 64 may comprise an aperture of at least the size of the piston rod so as to not impede the reciprocating linear motion of the pusher 61. More than one pusher assembly 60, and therefore more than one reject bin 70, can be used, depending on the types of product inspection (checkweigh, metal detection, X-ray) used.

The reject bin(s) 70 is/are positionable on either the forward or aft side of the product inspection apparatus 1. Preferably, the at least one reject bin 70 is positionable on the opposite side of the product inspection apparatus 1 to its corresponding pusher assembly 60.

The reject bin(s) 70 may comprise a removable tray as its bottom wall, so as to facilitate simple and efficient cleaning along with the easy removal of its contents. To observe products in the reject bin, the reject bin may comprise a viewing window. Traditionally the window is made of glass or perspex. However, rejected products from the pusher assembly travel at relatively high speeds into the reject bins and tend to impact the window with sufficient force to damage the window of the reject bin after some time in operation. To eliminate this damage, the viewing window of the reject bin may comprise a viewing opening, e.g. a series of open slots, that better resist damage from products hitting the inside of the reject bin 70.

The reject bin(s) 70 may be attached to the conveyor system 10, the support beam 21 and/or any other component(s) of the support structure 20 (e.g. a support leg 40 and/or the support column 30), by any suitable techniques known in the art, e.g. using brackets etc. Alternatively, or additionally, the reject bin(s) 70 each comprise at least one anti-vibration mount 75 (FIG. 9) for attaching them to at least one of the conveyor system 10, the support beam 21 or any other component(s) of the support structure 20. The anti-vibration mounts 75 act as shock absorbers/dampers in so that that the rejected product(s) falling into the reject bin(s) 70 do not cause vibrations that may lead to erroneous readings at the load cell of the weigh conveyor 18.

In order to prevent the products that are being transported by the conveyor system 10 from being contaminated by external sources, the conveyor system 10 may further comprise an optional cover. As shown in FIG. 1, the cover houses at least portion of the conveyor system 10, or multiple conveyor systems. The pusher plates 62 as well as the other moving parts of the checkweigher such as the conveyor present a hazard, should a user place his or her hands or other body parts in this area. The cover is required for safety and protection of people in the vicinity of the product inspection apparatus. As products are transported by the conveyor system 10 at high speeds, the pusher assembly(ies) 60 may push the rejected products from the conveyor system into the reject bin(s) at high speeds and with significant force. If any user's body parts are in the way of a moving pusher blade, the force of the impact can cause substantial damage, and in extreme cases, break bones.

Traditionally, a liftable cover 50 (FIG. 1) is positionable over the conveyor beds 11 of the conveyor system 10, specifically around the edges of the conveyor beds 11 such that the liftable cover does not make contact with the conveyor belt 12. The liftable cover 50 comprises two side walls associated to the aft and forward side of the conveyor system 10 (only the forward side wall is shown in figures). The side walls are laid along at least part of the longitudinal length of the conveyor system 10, e.g. onto the conveyor bed(s) 11 (such that they are unaffected by the motion of the conveyor belt). A sidewall may comprise at least one recess or cut-out for at least one bracket (e.g. a pneumatic cylinder bracket for a pusher plate), a part of the conveyor system 10 (e.g. a drive belt 14) or to provide a window or grating for viewing the conveyor system 10 in use.

The liftable cover 50 may further comprise a top surface or roof 51 bridging the side walls, whereby the top surface is parallel to the conveyor belt 12. The liftable cover may further comprise at least one hinged door 52 to allow a user access to areas of the conveyor system, in particular products transported along the conveyor system 10, if there is a need to gain access to the conveyor system, e.g. a jam. The hinged door 52 can then be lowered in order to minimise the possibility of external contamination of the products being transported. To prevent a user from inadvertently opening the hinged door whilst the conveyor system is running and risking injury, one or more interlocks are used to disable the conveyor system and the pusher assembly when the door is opened when the conveyor system is running.

However, the problem with such a safety device is that a user would have to stop the operation of the product inspection apparatus each time there is a jam or malfunction of the conveyor system or some other issue requiring a user to gain access to areas underneath the cover. As a result, it is common for users to disable the operation of the interlock when operating the product inspection apparatus 1 in order to allow the user to quickly gain access to products on the conveyor belt. In an extreme case, the covers are completely removed and replaced by hazard/warning signs which in some cases are not effective due to the lack of understanding of the signs. This can result in work place accidents.

Equally important, the top surface of the cover is frequently used as a platform or a table to support various objects such as a clip board, beverages etc., increasing the potential for foreign bodies to drop onto the conveyor system 10 and enter the production line. Such foreign bodies cannot be detected if the foreign bodies enter the production line downstream of the inspection stations and weigh conveyor 18, e.g. on the exit conveyor 19.

A cover is thus required that prevents a user disabling the safety feature in order to gain access to the interior of the cover and that prevents users using the cover as a platform for storing various objects.

To mitigate this problem, instead of a physical cover overlaying the conveyor system, the present invention defined a hazard zone comprised by a conveyor system, said conveyor system comprises a safety sensor to provide an indication and/or alarm and/or disable operation of the conveyor system when the hazard zone is entered by an unexpected item. An unexpected item can be a body part such as a hand, or any foreign objects, e.g. screws, bolts etc. Said safety sensor may comprise an optical sensor, e.g. a light guard. In some options, the conveyor system uses one or more light guards (also referred to as safety light curtains) to provide non-physical (non-solid) curtain around the vicinity of the conveyor system, in particular above the conveyor system such that the light guard is spaced sufficiently above any of the conveying surfaces so as to allow the conveyed products to pass underneath the light guard without intercepting it. Any type of light guard known in the art that provides a light curtain such that when intercepted by an object such as a body part the light guard can actuate a switch/safety device e.g. to stop the conveyor system and/or pusher assemblies, is permissible in the present invention. The light guard may comprise a light curtain configured to provide an array of beams (e.g. laser beams). The sensitivity of the light guard to detect objects is dependent upon the number of beams in the light curtain and/or the number of light beams. The gap between each beam of the array of beams may be between 1 mm and 30 mm, preferably between 1 mm and 10 mm. A reduced beam gap reduces the chances of small items falling through the light guard unnoticed. The operating range of the light guards (i.e. the distance between the emitted and receiver) may be between 0.1 m and 50 m, preferably between 0.3 m and 20 m. An example of a light guard suitable to be used in the present invention is a Safety Light Curtain F3SG-R Series by Omron.

The switch/safety device to stop the operation of the conveyor system and/or any other moving parts includes actuation of a pressure release system of the pusher assembly, e.g. a blow-off valve, dump valve or compressor valve. The pressure release system is designed to release pressure in the intake system of the pusher assembly when the power is removed and thereby, halt the movement of the pusher arms. The light guard is thereby arranged to serve in place of a physical (solid) top wall of a safety cover for the product inspection apparatus. Similarly, a light guard may be used in place of one or more physical (solid) side walls of a safety cover for the product inspection apparatus A safety cover comprising physical side walls may be provided. Alternatively, at least one the side walls, or a part of at least one of the side walls, may be replaced with a light guard or guards. This prevents a user from using the top surface 51 as a platform or table for resting various objects on. The very absence of a top surface will discourage personnel from attempting to place objects there. Should a person nevertheless attempt to place an object there, this will interrupt the light curtain and trigger the safety device. Alternatively or in addition to an interlock/switch, the optical cover may comprise a safety relay which removes motive power from the guarded equipment (e.g. conveyor system 10 and/or pusher assemblies 60) in the event an object is detected. The safety relay may comprise muting functionality enabling temporary disablement of the safety function so as to allow objects to pass through the safety light guard(s) without tripping the safety device. In some options of the present invention, the safety sensor is a proximity sensor.

In some options of the present invention, the conveyor system may comprise at least one camera (e.g. a thermal imaging camera) to monitor a hazard zone of the conveyor system. The hazard zone can represent areas around the conveyor system that can cause injury such as the motors driving the conveyor belt, the pusher assembly and the belt itself or any moving parts of the conveyor system. A thermal imaging camera is useful as it can provide an alert or actuate a safety device/switch if motion is detected, specifically motion at a particular temperature, e.g. within the temperature range of a human body in the vicinity of the hazard zone, so as to prevent a person from entering the hazard zone. The at least one camera may be positionable above and/or on the conveyor system.

By reducing the need for a physical barrier, the safety light guards increase the maintainability of the equipment they are guarding. Specifically, they allow the conveyor system 10 to be cleaned without the need to remove the cover. In order to prevent spurious infrared light from actuating the safety device, the light beams emitted from the transmitter may be sequenced, one after the other, and/or may be pulsed at a specific frequency, and the receiver is designed to only accept the specific pulse and/or frequency from the corresponding transmitter.

Having a support structure 20 of the present invention, whereby the conveyor system 10 and/or at least one station is mounted to the support beam by at least one externally mounted support column 30 reduces the number of support beams necessary to support the conveyor system in order to provide the necessary vibration dampening. Externally mounting the damper to the support beam 21 permits the transport conveyor(s), and optionally also the load conveyor sand/or at least one product inspection station to be mounted to a single support beam further opening the support structure 20. In addition, supporting the support beam by two or more leg hoop assemblies or the like simplifies the support structure 20 as it provides an open framework for ease of cleaning, and reducing or eliminating concealed areas that are a harbour for bacteria.

Whilst having a support structure 20 that is open to allow easy cleaning and absence or reduction of hard to reach areas is advantageous in meeting the hygienic requirements of the product inspection apparatus, another problem encountered when cleaning the product inspection apparatus with water or cleaning chemicals is that the liquid tends to accumulate on surfaces of the product inspection apparatus in particular the exterior surfaces of the reject bin(s) 70 and the electronic cabinet 100. If not wiped or dried, the liquid would tend to stagnate in those areas. To mitigate the need to wipe the outer housing of the electronic cabinet 100 and/or the reject bin(s) 70 which is time consuming, the surfaces of the electronic cabinet 100 and/or the reject bin(s) 70 are profiled with one or more run-off surfaces whereby liquid falling on these surfaces runs off the surfaces. As shown in FIG. 2, the run-off surface is provided by shaping one or more exterior walls of the outer housing of the electronic cabinet and/or the reject bin with a non-horizontal surface such that liquid falling on those surfaces would run off. In the particular example shown in FIG. 2, the top wall and front wall of the electronics cabinet 100 and the reject bins 70 are angled to provide one or more run-off surfaces. Other surfaces of the product inspection apparatus 1 may be provided with a run off surface. For example, the profile of the at least one support column 30 may be angled to provide one or more run off surfaces (see FIG. 4).

Typically, the product inspection apparatus 1 is cleaned by hosing the product inspection apparatus 1 with a high pressure water jet. To be IP69K or equivalent compliant, the product inspection apparatus 1 and components thereof should be able to resist the ingress of liquid or water particularly from the high pressure water jet. Components that are vulnerable to the ingress of water includes the motors and/or gear box used to drive the conveyor system 10. Such motors and/or gear box mounted to the electric motor are encased in a housing, typically a metal housing. To avoid damage by the ingress of water or liquid, typically the components of the motor such as the gearbox and/or the outer housing comprise various seals to make them IP69K compliant. However, the use of a number of seals and the costs associated with making sure that the motors are IP69K compliant can be high and uneconomical to repair should any of the seals break down or disintegrate, e.g. through use of aggressive cleaning chemicals.

Figure 12C:
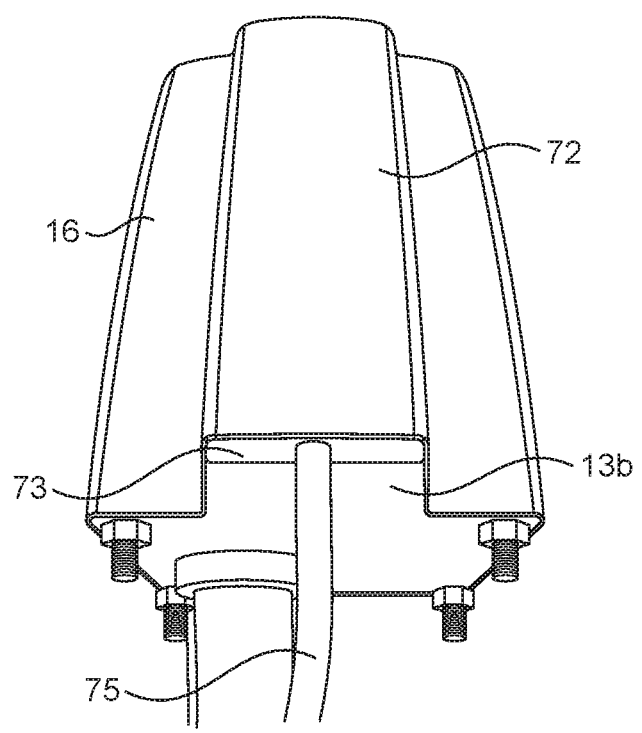

The present invention has mitigated this problem by providing a removable outer external jacket 16 for the motor housing that prevents the ingress of liquid into the body of the motor and thereby, making the motor IP69K compliant. This is shown in FIGS. 12A-c. The removable outer jacket 16 provides an hermetic seal around the body of the motor to an extent that the motor itself does not need to be IP69K compliant. Thus, the IP69K rating of the motor is provided by the removable outer jacket 16. The motor jacket 16 may be made of a material that repels liquid or water. For example, the motor jacket 16 can be made of any suitable material, for example, stainless steel or aluminium (aka aluminum), or a plastic, for example, ABS (Acrylonitrile butadiene styrene) or any other plastics or elastomer material.

The liquid or water protection provided by the motor jacket 16 permits a lower IP rated motor (for example, IP66) to be used and still fulfil the requirements of IP69K compliancy. The motor cover 16 can be made of a flexible materials such as plastic or rubber or a combination thereof. This allows the motor jacket 16 to act as a sheath so as to snugly fit around the motor 13 (and/or motor housing). In the particular embodiment of the present invention, the motor 13 is mounted to a gearbox 13*b* (see FIG. 12A)

The removable outer jacket 16 has a closed end and an open end. The open end allows the motor jacket 16 to be easily slid onto the exterior surface of the motor/gearbox housing. The motor is mounted to a plate having an aperture to allow the drive shaft of the electric motor to extend therethrough. In the particular embodiment of the present invention as shown in FIG. 12A, the electric motor is mounted to the gearbox 13*b* and the gearbox 13*b* is mounted to the plate. The plate provides a flange around the outer periphery of the motor housing. The flange at the end of the motor housing cooperates with the end of the opening of the removable outer jacket 16 to seal the end of the opening to the flange of the motor housing.

Not only does the removable outer jacket 16 need to house the exterior surface of the motor/gearbox but also needs to provide protection to any cabling running out of the motor otherwise such areas are vulnerable to ingress of water or cleaning fluids. Equally, the irregular shape of the motor/gearbox combination would make it difficult for the outer jacket 16 to form a hermetic seal around the periphery of the motor/gearbox (13, 13*b*). As shown in FIG. 12A, the exterior surface of the motor 13 may comprise a protrusion in the form of a cable block 71 at which point a power cable 75 of the motor 13 is connected to the motor 13 via the motor housing (not to be confused with the motor cover). Simply shaping the removable outer jacket 16 to accommodate the motor cabling will still leave areas of the removable outer jacket 16 open to ingress of fluids. For example, as shown in FIG. 12A, the jacket 16 may comprise a corresponding protrusion in the form of a channel 72 along at least a part of one side of the jacket 16. The channel 72 has an opening 72b that extends into the open end of the removable outer jacket 16 so as to allow the jacket 16 to house the cabling and the cable block 71 of the motor when the jacket 16 is slid onto the exterior surface of the motor/gearbox 13, 13b and seals the periphery of the gearbox 13b. However, once the jacket 16 is placed onto the motor/gearbox itself, the open end 72b of the channel will provide access for the ingress of water or other liquids to enter the motor 13 and/or gearbox 13b. In order to mitigate or remove this problem, a grommet 73 (comprising rubber, e.g. neoprene rubber or another synthetic rubber) may be placed downstream the cable 75 from the cable block 71 that seals the open end 72b of the channel 72. The grommet 73, in some options, comprises a slit or groove 74. i A portion of the cable 75 is nested within the groove 74 of the grommet 73 in a tight snug fit to prevent the ingress of liquid travelling along and within the groove (see FIG. 12B). For example, the grommet 74 can be made of a resilient material, e.g. rubber, that is able to flex to extend the opening of the groove or slit 74 to accommodate the cable and flex back to form a tight snug fit around the cable and thereby, sealing the cable against the ingress of water. The grommet 73 may be incorporated within the channel 72, e.g. mouth 72b of the channel, such that it forms part of the jacket 16 or the grommet 73 is separate to the jacket 16 as shown in FIG. 12A. The grommet 73 may be dimensioned such that it snugly fits into the channel 72 and/or around part of the cable 75 and/or at least part of the cable block 71 as the motor 13 is slidingly inserted into the motor cover 16. In the particular embodiment shown in FIG. 12A, the grommet 73 is separate to the removeable outer jacket 16 (see FIG. 12A and FIG. 12B). As shown in FIG. 12B, the grommet 73 is separately fitted to the cable 75 of the motor and rests on the gearbox 13b casing. The grommet 73 is positioned on the motor 13 or gearbox 13b such that the channel 72 of the outer jacket 16 travels along and over the grommet 73 as the jacket 16 is slid onto the motor 16 and thereby, seals the outer periphery of the gearbox 13b. As shown in FIG. 12C, in addition to sealing the periphery of the gearbox 13b, the grommet 73 seals the open end of the channel 72 from the ingress of fluids in the channel area 72. The motor 13 and the gearbox 13b is mounted to the plate having an aperture for a drive shaft of the electric motor and/or gearbox to extend therethrough (see FIG. 9). Sealing of the jacket 16 to the motor/gearbox can be either by the sealing of the open end of the jacket 16 around the periphery of the gearbox and/or the sealing against the plate as the open end of the jacket 16 butts up against the plate or a combination thereof.

The foregoing is provided for purposes of illustrating, explaining and describing embodiments of the present invention. Further modifications and adaptations to these embodiments will be apparent to those skilled in the art and may be made without departing from the scope of the present invention as defined in the claims.

Further features of the present invention:—
A. A product inspection apparatus comprising:
 a) a conveyor system for transporting items, said conveyor system comprising:
  i) a weigh conveyor comprising a load detector for detecting the weight of items transported on the conveyor system; and
  ii) a transport conveyor adjacent the weigh conveyor;
 b) a support structure comprising a support beam;
 wherein the transport conveyor is mounted to the support beam by at least one support column externally mounted to the support beam such that vibrations are suppressed by the at least one externally mounted support column.

B. The product inspection apparatus of Feature A, wherein the transport conveyor comprises an infeed conveyor and an exit conveyor, and the weigh conveyor is positioned between the infeed conveyor and the exit conveyor such that the infeed conveyor transports items to be weighed to the weigh conveyor and the exit conveyor receives items from the weigh conveyor.

C. The product inspection apparatus of Feature A or B, wherein the conveyor system is a belt conveyor system.

D. The product inspection apparatus of any of the preceding Features A to C, wherein the support beam is a single support beam such that the conveyor system is mounted to the single support beam.

E. The product inspection apparatus of any of the preceding Features A to D, wherein at least a portion of the support beam is non-tubular.

F. The product inspection apparatus of Feature E, wherein the support beam is non-tubular.

G. The product inspection apparatus of Feature E or F, wherein the support beam is configured as an open box structure.

H. The product inspection apparatus of any of the Features E to G, wherein the transverse cross-sectional profile of the support beam adopts a semi octagonal shape.

I. The product inspection apparatus of any of the preceding Features A to H, wherein the support structure further comprises support legs, wherein the support beam is mounted to the support legs.

J. The product inspection apparatus of Feature I, wherein each of the support legs comprises a leg hoop assembly.

K. The product inspection apparatus of any of the preceding Features A to J, wherein the at least one support column comprises a through-going longitudinal passageway.

L. The product inspection apparatus of Feature K, wherein the at least one support column comprises a plastic material.

M. The product inspection apparatus of any of the preceding Features A to L, wherein the support structure comprises a plurality of rings attached to the support structure for feeding cabling therethrough.

N. The product inspection apparatus of any of the preceding Features A to M, further comprising:
 i) a control cabinet housing electronic components attached to the support structure; and/or
 ii) a reject bin attached to the support structure,
 wherein the outer profile of the control cabinet and/or the reject bin is shaped to provide fluid run-off on all of it surfaces so as to prevent fluid from standing on any of its surfaces.

O. The product inspection apparatus of Feature N, wherein the profile of all of the surfaces of the control cabinet and/or reject bin is/are non-horizontal.

P. The product inspection apparatus of any of the preceding Features A to O, further comprising at least one station wherein the or each of the at least one station(s) comprises a metal detector station or an X-ray machine station mounted to the support beam.

Q. A conveyor system comprising a conveyor for transporting items and a hazard zone, and a safety sensor to provide an indication and/or alarm and/or disable operation of the conveyor system when the hazard zone is entered by an unexpected item.

R. The conveyor system of Feature Q, wherein the safety sensor comprises an optical sensor.

S. The conveyor system of Feature R, wherein the optical sensor is a light guard that is configured to provide a light curtain above the conveyor and/or on one or both sides of the conveyor.

T. The conveyor system of any of the Features Q to S, further comprising a cover comprising physical sidewalls such that the safety sensor is mounted above the conveyor.

U. The conveyor system of Feature Q, wherein the safety sensor is a proximity sensor.

V. A product inspection apparatus comprising
   a) a conveyor system as defined in any of the Features Q to U, said conveyor system further comprising:
      i) a weigh conveyor comprising a load detector for detecting the weight of items transported on the conveyor system; and
      ii) a transport conveyor adjacent the weigh conveyor.

W. A removable waterproof outer jacket for sealing an electric motor against water, said electric motor mounted to a plate having an aperture for a drive shaft of the electric motor to extend therethrough, said removable outer jacket comprising an open end for allowing the removable outer jacket to be slid onto the exterior surface of the motor; said jacket being dimensioned for fitting snugly over the motor so as to seal said motor against the ingress of water; wherein the open end of the removable outer jacket is configured for cooperating with the plate and/or electric motor to seal the opening of the removable outer jacket.

X. The removable waterproof outer jacket of Feature W, wherein the removable outer jacket comprises a channel for accommodating a cable of the electric motor, said channel comprises an open end that extends into the open end of the removable waterproof outer jacket, wherein the open end of the channel is sealed from the ingress of fluid by a grommet that snugly fits within the channel.

Y. The removable waterproof outer jacket of Feature X, wherein the grommet comprises a groove or slit for accommodating a portion of the cable in a snug fit.

Z. The removable waterproof outer jacket of any of the Features W to Y, wherein the electric motor is mounted to a gearbox and the gearbox is sealed to the plate such that the removable outer jacket seals the periphery of the gear box.

What is claimed is:

1. A product inspection apparatus comprising:
   a) a conveyor system for transporting items, said conveyor system comprising:
      i) a weigh conveyor comprising a load detector for detecting the weight of items transported on the conveyor system; and
      ii) a transport conveyor adjacent the weigh conveyor;
   b) a support structure comprising a support beam;
      wherein the weigh conveyor is externally mounted to the support beam;
      wherein the transport conveyor is mounted to the support beam, separately from the weigh conveyor, by at least one support column externally mounted to the support beam such that vibrations are suppressed by the at least one support column;
      wherein the at least one support column comprises a resilient material for vibration suppression.

2. The product inspection apparatus as claimed in claim 1, wherein the transport conveyor comprises an infeed conveyor and an exit conveyor, and the weigh conveyor is positioned between the infeed conveyor and the exit conveyor such that the infeed conveyor transports items to be weighed to the weigh conveyor and the exit conveyor receives items from the weigh conveyor.

3. The product inspection apparatus as claimed in claim 1, wherein the conveyor system is a belt conveyor system.

4. The product inspection apparatus as claimed in claim 1, wherein the support beam is a single support beam such that the conveyor system is mounted to the single support beam.

5. The product inspection apparatus as claimed in claim 1, wherein at least the support beam is non-tubular along its full length.

6. The product inspection apparatus as claimed in claim 5, wherein the support beam is configured as an open box structure.

7. The product inspection apparatus as claimed in claim 5, wherein the transverse cross-sectional profile of the support beam adopts a semi octagonal shape.

8. The product inspection apparatus as claimed in claim 1, wherein the support structure further comprises support legs, wherein the support beam is mounted to the support legs.

9. The product inspection apparatus as claimed in claim 8, wherein each of the support legs comprises a leg hoop assembly.

10. The product inspection apparatus as claimed in claim 1, wherein the at least one support column comprises a through-going longitudinal passageway.

11. The product inspection apparatus of as claimed in claim 1, wherein the support beam is a metal material and the at least one support column comprises a plastic material or a rubber material or a combination of plastic and rubber.

12. The product inspection apparatus as claimed in claim 1, wherein the support structure comprises a plurality of rings attached to the support structure for feeding cabling therethrough.

13. The product inspection apparatus as claimed in claim 1, further comprising:
    i) a control cabinet housing electronic components attached to the support structure; and/or
    ii) a reject bin attached to the support structure,
    wherein the outer profile of the control cabinet and/or the reject bin is shaped to provide fluid run-off on all of it surfaces so as to prevent fluid from standing on any of its surfaces.

14. The product inspection apparatus as claimed in claim 13, wherein the profile of all of the surfaces of the control cabinet and/or reject bin is/are non-horizontal.

15. The product inspection apparatus as claimed in claim 1, further comprising at least one station wherein the or each of the at least one station(s) comprises a metal detector station or an X-ray machine station mounted to the support beam.

16. A product inspection apparatus comprising:
    a) a conveyor system for transporting items, said conveyor system comprising:
       i) a weigh conveyor comprising a load detector for detecting the weight of items transported on the conveyor system; and
       ii) a transport conveyor adjacent the weigh conveyor;
    b) a support structure comprising a non-tubular support beam;
       wherein the transport conveyor is mounted to the non-tubular support beam by at least one support column externally mounted to the non-tubular support beam such that vibrations are suppressed by the at least one support column;

wherein the weigh conveyor is supported by the non-tubular support beam separately from the transport conveyor;

wherein the non-tubular support beam includes an open bottom region that defines an upwardly extending channel.

17. The product inspection apparatus of claim 16, wherein the weigh conveyor is mounted onto a load cell, or a housing of the load cell, wherein the load cell or housing is externally mounted onto the non-tubular support beam.

18. The product inspection apparatus of claim 16, wherein a plurality of fixed rings are spaced apart along a length of the non-tubular support beam within the upwardly extending channel for enabling cable feeding along the non-tubular support beam.

19. A product inspection apparatus comprising:
   a) a conveyor system for transporting items, said conveyor system comprising:
      i) a weigh conveyor comprising a load detector for detecting the weight of items transported on the conveyor system; and
      ii) a transport conveyor adjacent the weigh conveyor;
   b) a support structure comprising a support beam;
      wherein the transport conveyor is mounted to the support beam by at least one support column externally mounted to the support beam such that vibrations are suppressed by the at least one support column;
      wherein the weigh conveyor is supported by the support beam separately from the transport conveyor;
      wherein the support structure further comprises support leg assemblies, wherein a mount bracket is welded to each support leg assembly and the support beam is mounted to each mount bracket by screws or bolts or U-bolts.

20. The product inspection apparatus of claim 19, wherein the support beam is a non-tubular support beam and each support leg assembly is of tubular configuration, and the at least one support column is mounted to the support beam by screws or bolts or U-bolts.

\* \* \* \* \*